US011236988B2

(12) United States Patent
Tsuboi et al.

(10) Patent No.: US 11,236,988 B2
(45) Date of Patent: Feb. 1, 2022

(54) LASER DISTANCE MEASURING APPARATUS

(71) Applicant: Mitsubishi Electric Corporation, Tokyo (JP)

(72) Inventors: Yoshitaka Tsuboi, Tokyo (JP); Masahiro Kawai, Tokyo (JP); Shohei Tsukamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/000,479

(22) Filed: Aug. 24, 2020

(65) Prior Publication Data

US 2021/0131791 A1    May 6, 2021

(30) Foreign Application Priority Data

Oct. 31, 2019  (JP) .............................. JP2019-198173

(51) Int. Cl.
| | | |
|---|---|---|
| *G01S 17/06* | (2006.01) | |
| *G01B 11/02* | (2006.01) | |
| *G01S 17/58* | (2006.01) | |
| *G01S 17/50* | (2006.01) | |
| *G01B 11/26* | (2006.01) | |

(52) U.S. Cl.
CPC ............ *G01B 11/026* (2013.01); *G01S 17/06* (2013.01); *G01S 17/50* (2013.01); *G01S 17/58* (2013.01); *G01B 11/26* (2013.01)

(58) Field of Classification Search
CPC ....... G01B 11/026; G01B 11/26; G01S 17/58; G01S 17/50; G01S 17/06; G01S 17/89; G01S 17/931; G01S 7/4808; G01S 7/4817

See application file for complete search history.

(56) References Cited

U.S. PATENT DOCUMENTS

| | | | |
|---|---|---|---|
| 5,202,742 A | | 4/1993 | Frank et al. |
| 2013/0100438 A1* | | 4/2013 | Breuer .................... G01S 17/58 |
| | | | 356/51 |
| 2018/0106599 A1 | | 4/2018 | Takahashi |
| (Continued) | | | |

FOREIGN PATENT DOCUMENTS

| | | |
|---|---|---|
| JP | S62259111 A | 11/1987 |
| JP | S6355409 A | 3/1988 |
| (Continued) | | |

OTHER PUBLICATIONS

Communication dated Aug. 25, 2020, from the Japanese Patent Office in Application No. 2019-198173.

*Primary Examiner* — Jonathan M Hansen
(74) *Attorney, Agent, or Firm* — Sughrue Mion, PLLC; Richard C. Turner

(57) ABSTRACT

To provide a laser distance measuring apparatus which determines whether the moving body stops autonomously, without depending on the external environment information transmitted from the external apparatuses, and can lower the average power of the laser beam. A laser distance measuring apparatus compares light receiving signals detected at two time points at the same irradiation angle, determines whether the moving body stops, and when it is determined that the moving body stops, makes an average power per unit area and unit time of the laser beam emitted lower than that of when it is determined that the moving body does not stop.

15 Claims, 17 Drawing Sheets

(56) References Cited

U.S. PATENT DOCUMENTS

2018/0131915 A1* 5/2018 Nakamura .......... H04N 9/3129
2020/0363510 A1* 11/2020 Noguchi ............... G01S 7/4817

FOREIGN PATENT DOCUMENTS

| JP | H04249785 A | 9/1992 |
| JP | H07260937 A | 10/1995 |
| JP | 2005249623 A | 9/2005 |
| JP | 2018066609 A | 4/2018 |
| JP | 2018-205042 A | 12/2018 |

* cited by examiner

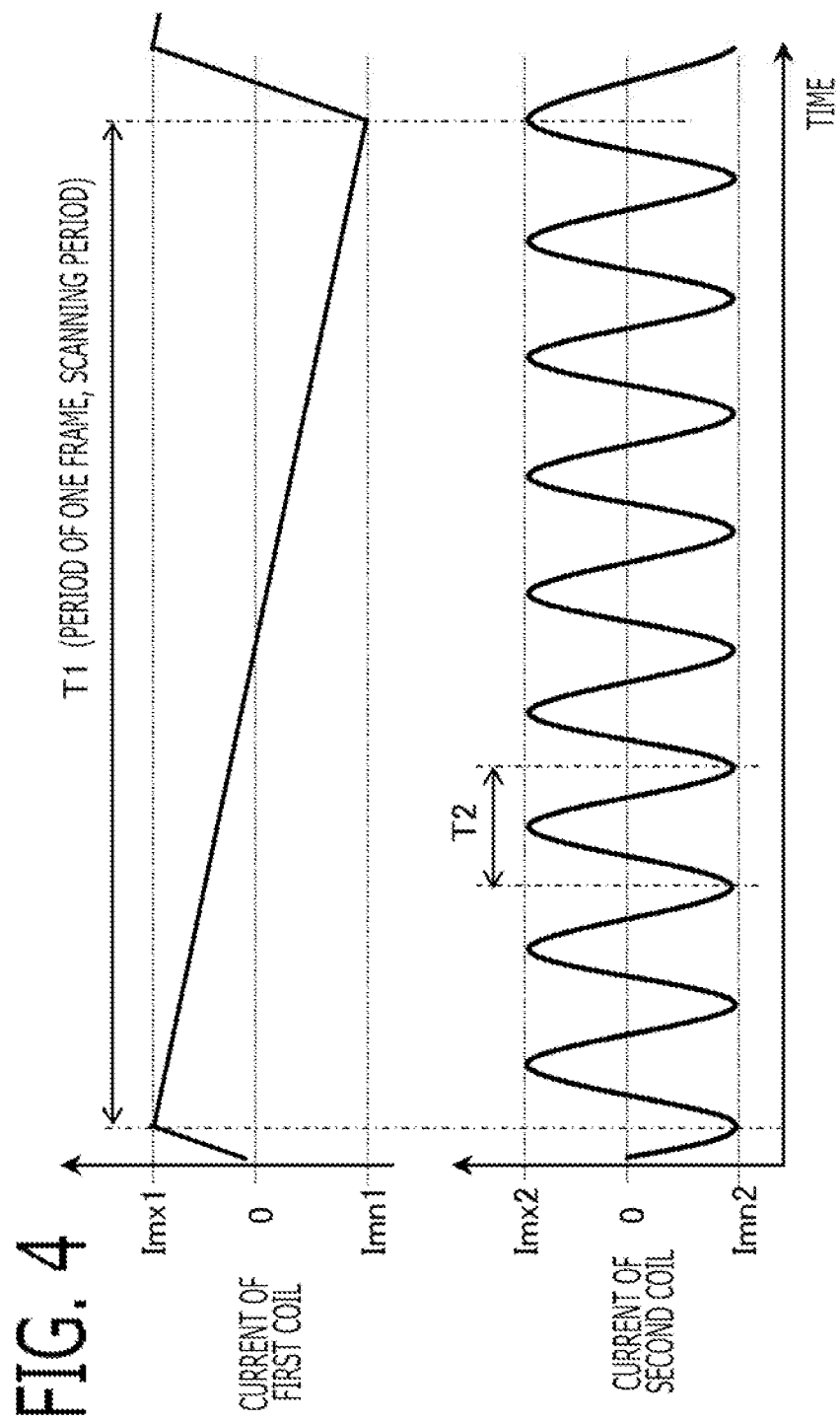

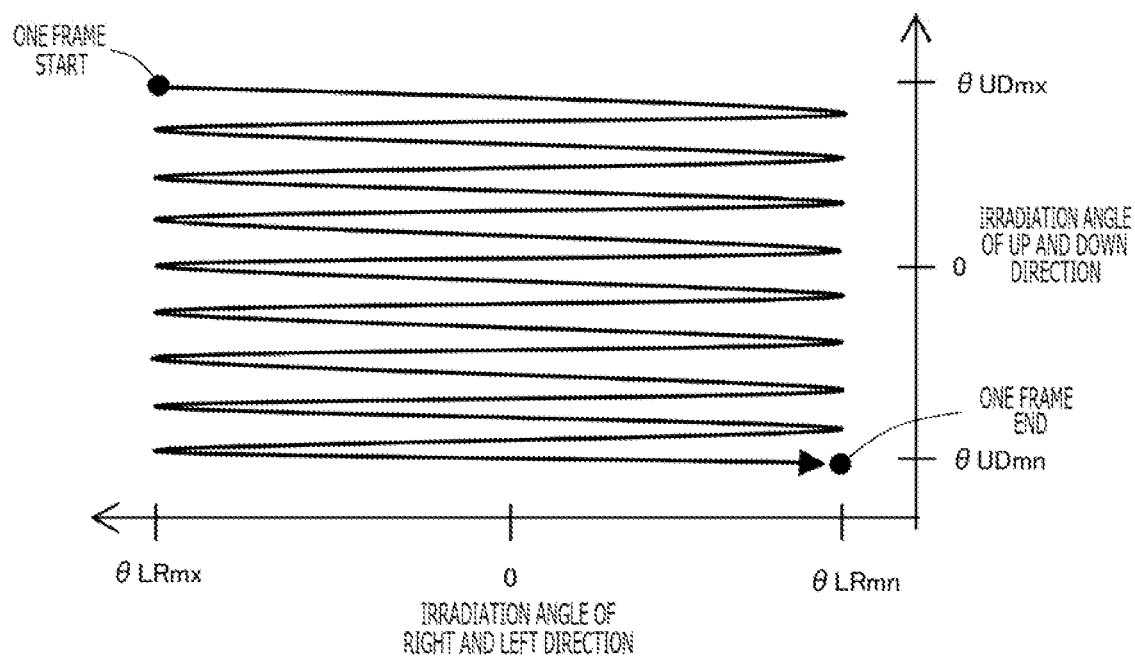
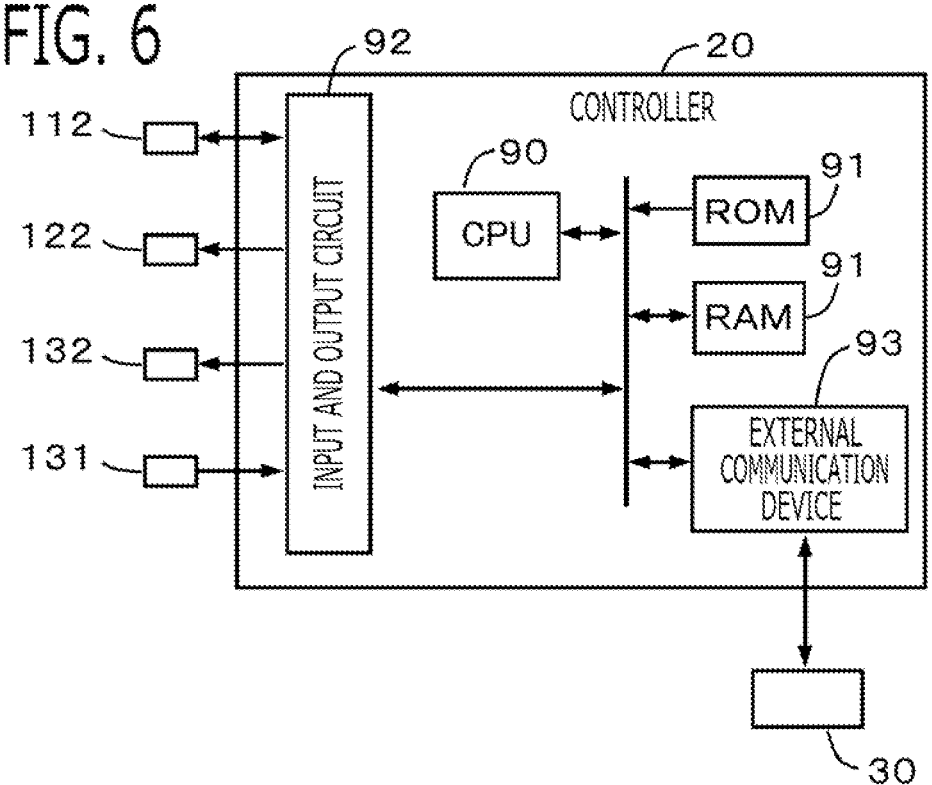

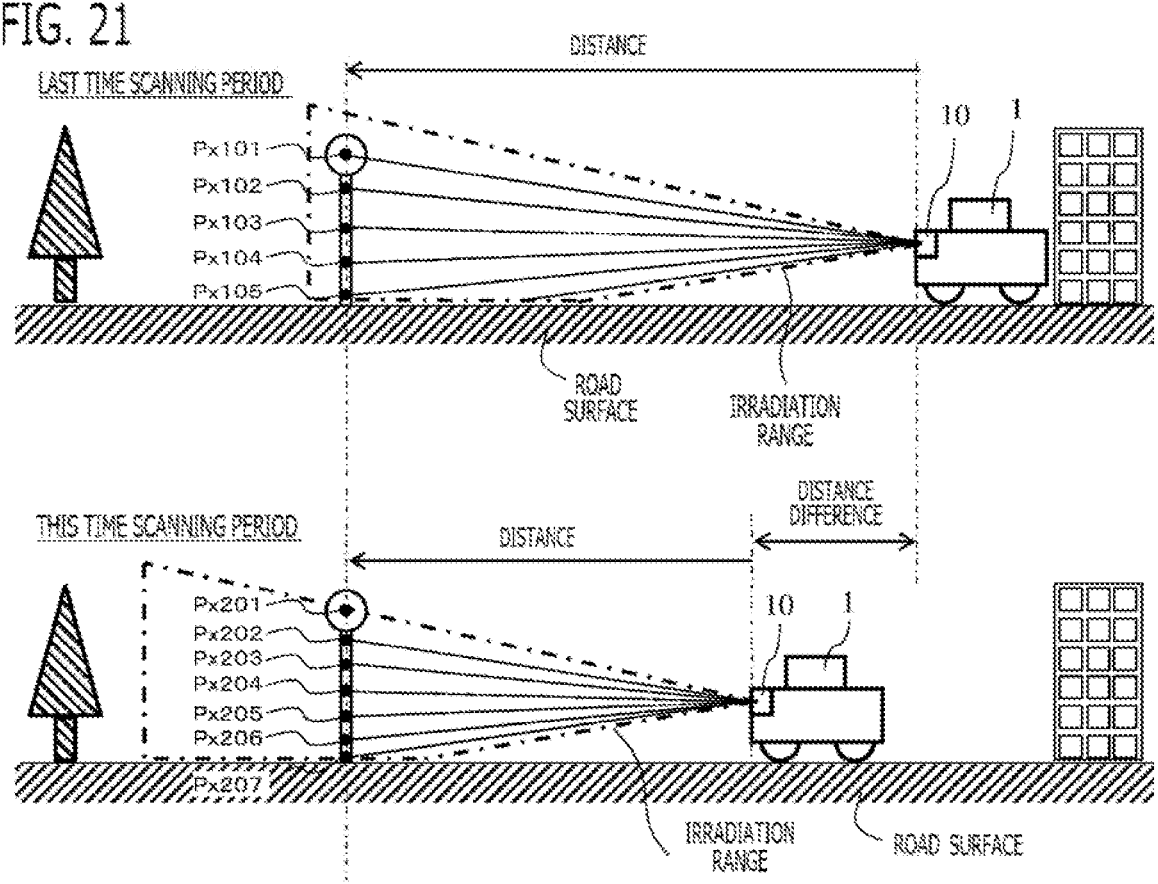

LASER DISTANCE MEASURING APPARATUS

INCORPORATION BY REFERENCE

The disclosure of Japanese Patent Application No. 2019-198173 filed on Oct. 31, 2019 including its specification, claims and drawings, is incorporated herein by reference in its entirety.

BACKGROUND

The present disclosure is related with a laser distance measuring apparatus.

Previously, there has been known the laser distance measuring apparatus which irradiates light beam, such as a laser beam, to the measuring object, and measures the distance to the object based on the reflected light which is reflected from the object. Such a laser distance measuring apparatus is also called LiDAR (Light Detection and Ranging) or a laser radar. The two-dimensional scan of the laser beam is performed by the scanning mechanism, the distance of the surrounding object and the direction of the object are obtained at the same time, and the three-dimensional distance image is obtained.

The laser distance measuring apparatus mounted on a moving body, such as a vehicle, is used for the monitoring of obstacles around the moving body, and distant obstacles, and it is requested that obstacles are detected in an early stage without overlooking.

SUMMARY

By the way, the laser distance measuring apparatus mounted on the moving body repeatedly emits a pulse form laser beam mainly. In order to perform long distance measurement, by increasing the luminescence intensity of the laser beam and extending the pulse width of the laser beam, the laser beam is made to reach to the distant place, the light receiving intensity of the reflected light reflected from the object is increased, and even the distant object can be detected.

On the other hand, it is supposed that the laser beam emitted from the laser distance measuring apparatus is also irradiated to the human body. Accordingly, the average power of the emitted laser beam needs to fulfill the safety standard. Especially, when the moving body stops, and when the moving body is slow speed, there is a high possibility that a pedestrian cross the front of the moving body, and the necessity of detecting the distant obstacle is low. Therefore, it is considered that the luminescence intensity of the laser beam is lowered and the safety to the human body is improved more.

For example, JP 2018-205042 A proposed the laser distance measuring apparatus which switches increase and decrease of the laser beam output based on external environment information. As the external environment information, the measured value of the illuminometer of the vehicle, the map information, the weather information, the on-off information of the headlight, and the on-off information of the wiper are used.

However, in the technology of JP 2018-205042 A, the external environment information is information transmitted to the laser distance measuring apparatus from the external apparatuses, and the apparatus cost increases for information transmission. When the external environment information is not transmitted to the laser distance measuring apparatus from the external apparatuses for some reason, the laser distance measuring apparatus cannot lower the luminescence intensity of the laser beam appropriately.

Then, the objective of the present disclosure is to provide a laser distance measuring apparatus which determines whether the moving body stops autonomously, without depending on the external environment information transmitted from the external apparatuses, and can lower the average power of the laser beam.

A laser distance measuring apparatus mounted on a moving body according to the present disclosure, including:

a laser beam generating unit that emits a laser beam;

a light receiving unit that receives a reflected light of the laser beam reflected by an object, and outputs a light receiving signal;

a distance calculation unit that calculates a distance to the object, based on the emitted laser beam and the light receiving signal;

a speed determination unit that determines whether or not the moving body stops by comparing the light receiving signals detected at two time points at the same irradiation angle; and an average power control unit that, when it is determined that the moving body stops by the speed determination unit, makes an average power per unit area and unit time of the laser beam emitted from the laser beam generating unit lower than that of when it is determined that the moving body does not stop.

According to the laser distance measuring apparatus of the present disclosure, since the light receiving signals detected at the two time points at the same irradiation angle become equivalent when the moving body stops, it can be determined with good accuracy whether the moving body stops, by comparing the light receiving signals detected at the two time points at the same irradiation angle. Then, when it is determined that the moving body stops, the average power per unit area and unit time of the laser beam is lowered rather than that of when it is determined that the moving body does not stop. Accordingly, when the moving body stops, safety of the laser beam which is irradiated to a human body, such as a pedestrian who crosses the front of the moving body can be improved. Therefore, it can be determined whether the moving body stops autonomously, without depending on the external environment information transmitted from external apparatuses, and the average power of the laser beam can be lowered.

BRIEF DESCRIPTION OF THE DRAWINGS

FIG. 4 is a time chart for explaining the driving current of the MEMS mirror according to Embodiment 1;

FIG. 5 is a figure for explaining the irradiation angle range of the up and down direction and the right and left direction according to Embodiment 1;

FIG. 6 is a hardware configuration diagram of the controller according to Embodiment 1;

FIG. 21 is a figure for explaining the stop determination of the moving body and the slow speed determination according to Embodiment 6.

DETAILED DESCRIPTION OF THE EMBODIMENTS

1. Embodiment 1

Figure 1:
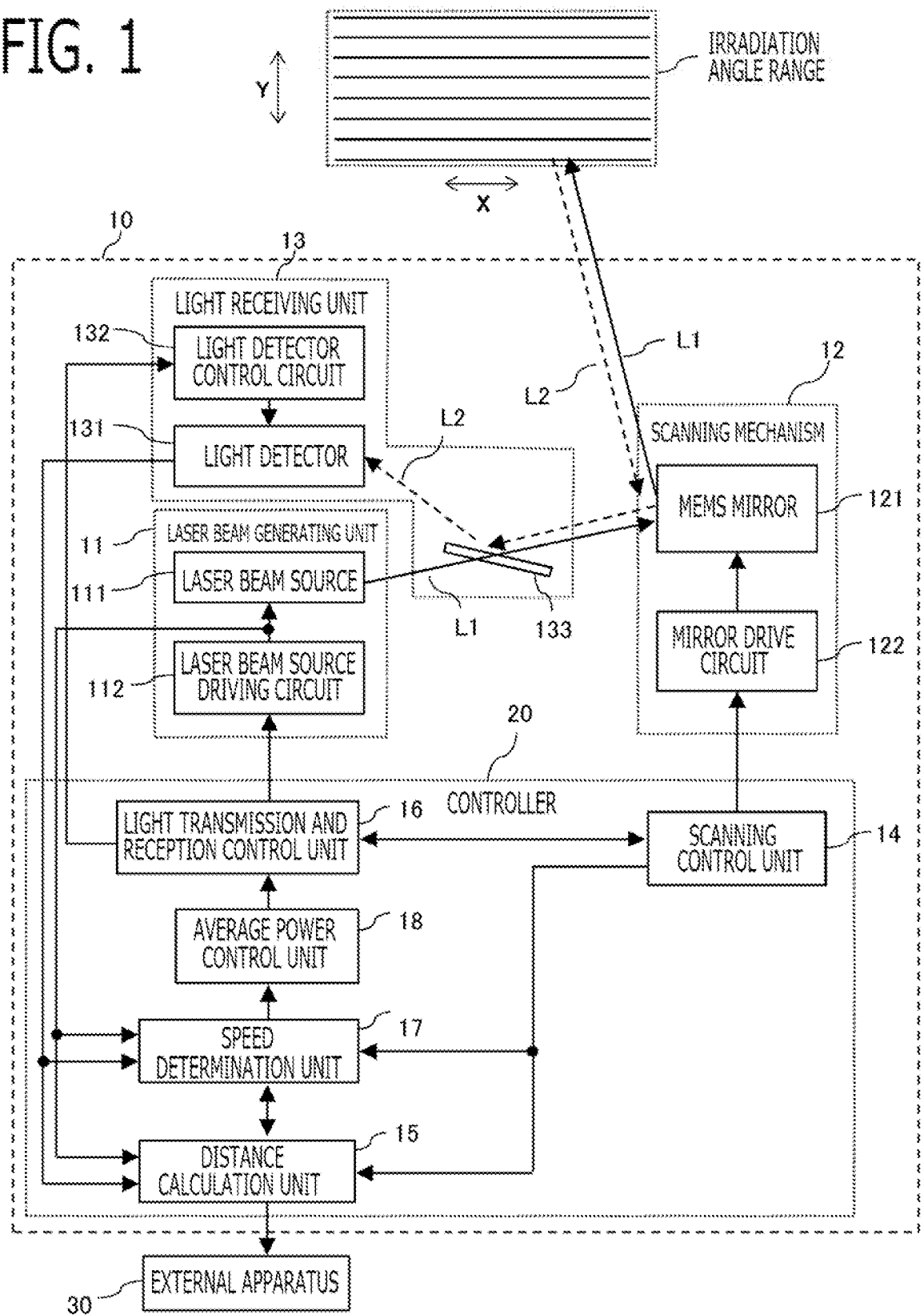
FIG. 1 is a figure showing the schematic configuration of the laser distance measuring apparatus according to Embodiment 1.
Figure 2:
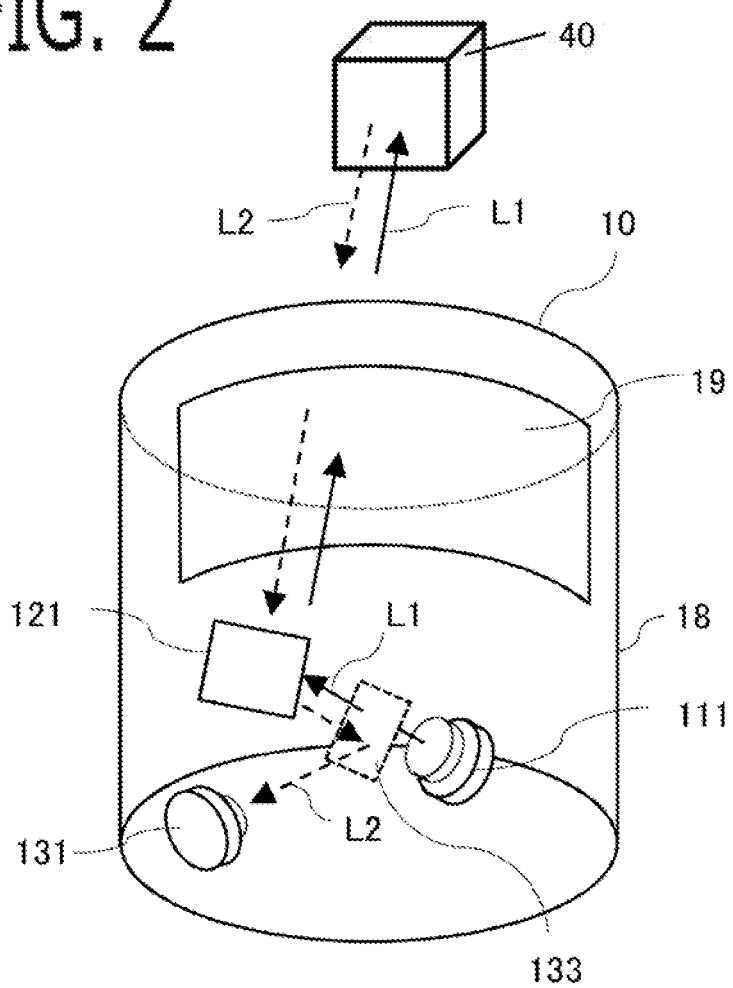
FIG. 2 is a figure showing the schematic diagram of the laser distance measuring apparatus according to Embodiment 1.

A laser distance measuring apparatus 10 according to Embodiment 1 will be explained with reference to drawings. FIG. 1 is a block diagram showing the schematic configuration of the laser distance measuring apparatus 10. FIG. 2 is a schematic diagram showing the schematic arrangement and configuration of the optical system of the laser distance measuring apparatus 10. The laser distance measuring apparatus 10 is also called as LiDAR or a laser radar. The laser distance measuring apparatus 10 is mounted on a vehicle as a moving body, irradiates a laser beam L1 to front of the moving body by two-dimensional scan, and measures a distance to the object, which exists in front of the moving body 1, from the laser distance measuring apparatus 10 (the moving body 1).

The laser distance measuring apparatus 10 is provided with a laser beam generating unit 11, a scanning mechanism 12, a light receiving unit 13, a scanning control unit 14, a distance calculation unit 15, a light transmission and reception control unit 16, a speed determination unit 17, an average power control unit 18, and the like. As described later, the controller 20 is provided with the scanning control unit 14 to the average power control unit 18. The laser beam generating unit 11 emits the laser beam L1. The scanning mechanism 12 is a mechanism which change the irradiation angle of the laser beam L1. The scanning control unit 14 controls the scanning mechanism 12, and scans the irradiation angle of the laser beam periodically. The light receiving unit 13 receives a reflected light L2 of the laser beam reflected by the object, and outputs a light receiving signal. The distance calculation unit 15 calculates an object distance which is a distance to the object, based on the emitted laser beam L1 and the light receiving signal.

1-1. Laser Beam Generating Unit 11

Figure 8:
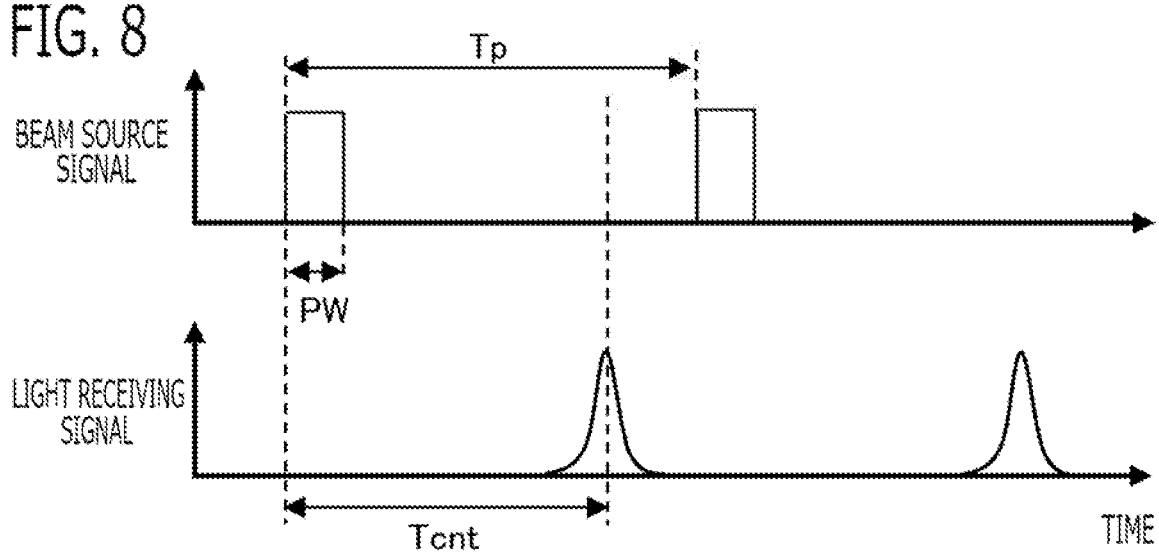
FIG. 8 is a time chart explaining the beam source signal and the light receiving signal according to Embodiment 1.

The laser beam generating unit 11 emits the laser beam L1. The laser beam generating unit 11 is provided with a laser beam source 111 and a laser beam source driving circuit 112. The laser beam source driving circuit 112 generates a pulse form output signal (beam source signal) which is turned ON at an emission period Tp, as shown in FIG. 8. The laser beam source driving circuit 112 generates the pulse form output signal, based on a command signal from the light transmission and reception control unit 16 described below. When the output signal transmitted from the laser beam source driving circuit 112 is turned ON, the laser beam source 111 generates the laser beam L1 of near infrared wavelength, and emits it toward the scanning mechanism 12. The laser beam L1 emitted from the laser beam source 111 transmits a collection mirror 133 disposed between the laser beam source 111 and the scanning mechanism 12.

1-2. Scanning Mechanism 12

The scanning mechanism 12 changes the irradiation angle of the laser beam L1. The scanning mechanism 12 changes the irradiation angle of the laser beam L1 to a first direction X and a second direction Y which is orthogonal to the first direction X. In the present embodiment, the laser beam L1 is irradiated to front of the moving body 1. The first direction X is set to a right and left direction with respect to a traveling direction of the moving body 1. The second direction Y is set to an up and down direction with respect to the traveling direction of the moving body 1. The scanning mechanism 12 is provided with a movable mirror 121 and a mirror drive circuit 122. As shown in FIG. 2, the laser beam L1 emitted from the laser beam source 111 transmits the collection mirror 133 and is reflected by the movable mirror 121, and then it transmits the transmission window 19 provided in the housing 9 and is irradiated to front of the moving body 1 at an irradiation angle according to angle of the movable mirror 121.

Figure 3:
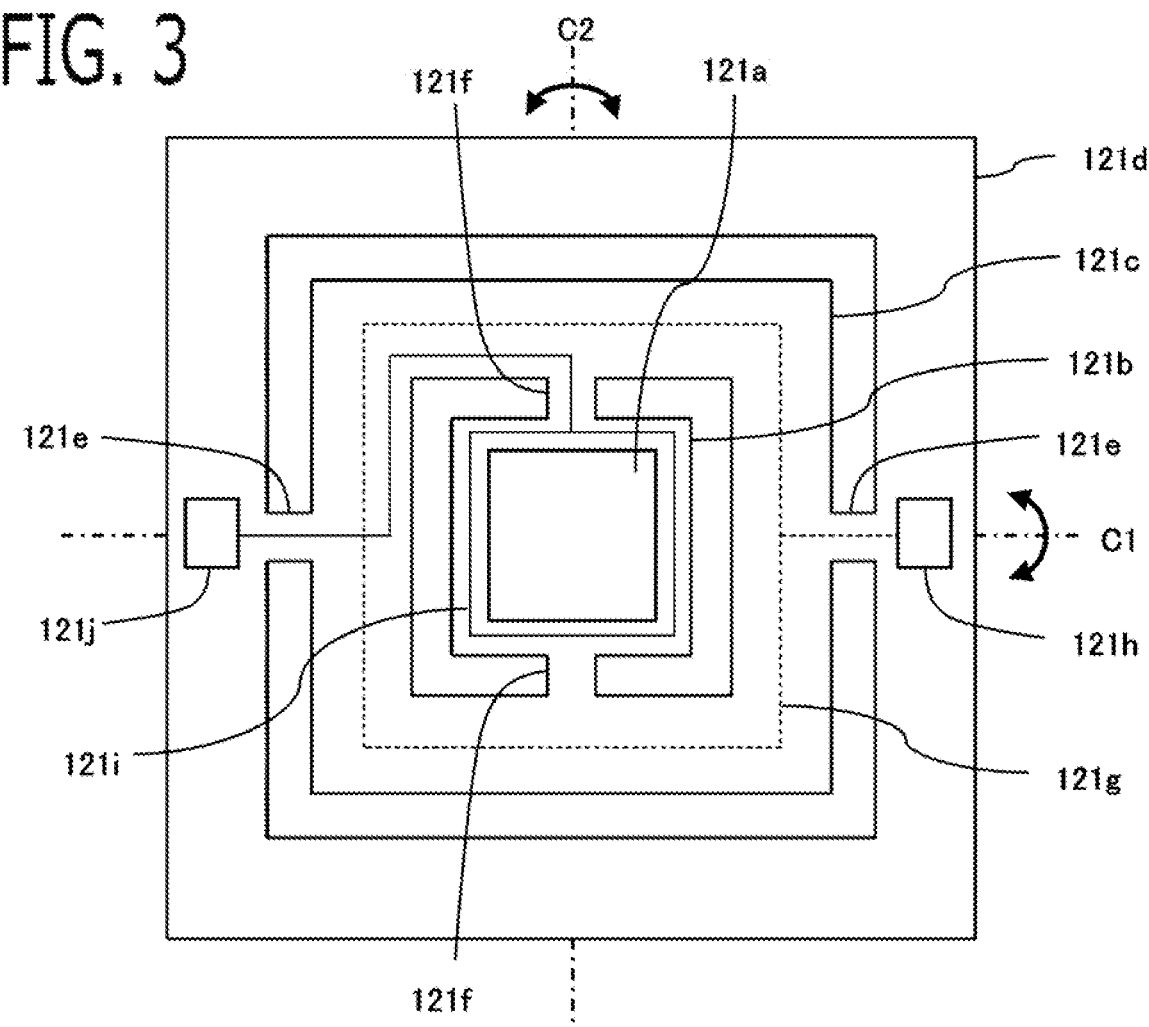
FIG. 3 is a figure for explaining the MEMS mirror according to Embodiment 1.

In the present embodiment, the movable mirror 121 is a MEMS mirror 121 (Micro Electro Mechanical Systems). As shown in FIG. 3, the MEMS mirror 121 is provided with a rolling mechanism which rotates a mirror 121a around a first axis C1 and a second axis C2 which are orthogonal to each other. The MEMS mirror 121 is provided with an inner frame 121b of a rectangular plate shape which is provided with the mirror 121a, an intermediate frame 121c of a rectangular ring plate shape disposed outside the inner frame 121b, and an outer frame 121d of a rectangular plate shape disposed outside the intermediate frame 121c. The outer frame 121d is fixed to a body of the MEMS mirror 121.

The outer frame 121d and the intermediate frame 121c are connected by right and left two first torsion bars 121e which have torsional elasticity. The intermediate frame 121c is twisted around a first axis C1 which connects the two first torsion bars 121e, with respect to the outer frame 121d. When twisted around the first axis C1 to one side or the other side, the irradiation angle of the laser beam L1 changes to up side or down side. The intermediate frame 121c and the inner frame 121b are connected by up and down two second torsion bars 121f which have elasticity. The inner frame 121b is twisted around a second axis C2 which connects the two second torsion bars 121f, with respect to the intermediate frame 121c. When twisted around the second axis C2 to one side or the other side, the irradiation angle of the laser beam L1 changes to left side or right side.

An annular first coil 121g along the frame is provided in the intermediate frame 121c. A first electrode pad 121h connected to the first coil 121g is provided in the outer frame 121d. An annular second coil 121i along the frame is provided in the inner frame 121b. A second electrode pad 121j connected to the second coil 121i is provided in the outer frame 121d. A permanent magnet (not shown) is provided in the MEMS mirror 121. When a positive or negative current flows into the first coil 121g, the Lorentz force which twists the intermediate frame 121c around the first axis C1 to one side or the other side occurs. And, the torsional angle is proportional to the magnitude of current. When a positive or negative current flows into the second coil 121i, the Lorentz force which twists the inner frame 121b around the second axis C2 to one side or the other side occurs. And, the torsional angle is proportional to the magnitude of current.

As shown in the upper row time chart of FIG. 4, the mirror drive circuit 122 supplies a current, which oscillates between a positive first maximum current value Imx1 and a negative first minimum current value Imn1 at a first period T1, to the first coil 121g via the first electrode pad 121h, according to the command signal of the scanning control unit 14. The first period T1 is a period for one frame of the two-dimensional scan. The vibration waveform of current is a saw tooth wave, a triangular wave, or the like. As shown in FIG. 5, the laser beam oscillates between a maximum irradiation angle θUDmx of the second direction Y corresponding to the positive first maximum current value Imx1, and a minimum irradiation angle θUDmn of the second direction Y corresponding to the negative first minimum current value Imn1 at the first period T1. The first maximum current value Imx1 and the first minimum current value Imn1 may be changed according to the operating condition.

As shown in the lower row graph of FIG. 4, the mirror drive circuit 122 supplies a current, which oscillates between a positive second maximum current value Imx2 and a negative second minimum current value Imn2 at a second period T2, to the second coil 121i via the second electrode pad 121j, according to the command signal of the scanning control unit 14. The second period T2 is set to a value shorter than the first period T1, and is set to a value obtained by dividing the first period T1 by a reciprocation scanning frequency of the first direction X in one frame. The vibration waveform of current is a sine wave, a rectangular wave, or the like. As shown in FIG. 5, the laser beam oscillates between a maximum irradiation angle θLRmx of the first direction X corresponding to the positive second maximum current value Imx2, and a minimum irradiation angle θLRmn of the first direction X corresponding to the negative second minimum current value Imn2 at the second period T2. The second maximum current value Imx2 and the second minimum current value Imn2 may be changed according to the operating condition.

1-3. Light Receiving Unit 13

The light receiving unit 13 receives a reflected light L2 of the laser beam reflected by the object in front of the moving body 1, and outputs a light receiving signal. The light receiving unit 13 is provided with a light detector 131, a light detector control circuit 132, and a collection mirror 133. As shown in FIG. 2, the reflected light L2 reflected by the object 40 in front of the moving body 1 transmits the transmission window 19 and is reflected by the movable mirror 121, and then it is reflected by the collection mirror 133 and enters the light detector 131.

The light detector 131 is provided with APD (Avalanche Photo Diode) and the like as a photo detector, and outputs the light receiving signal according to the received reflected light L2. The light detector control circuit 132 controls operation of the light detector 131 based on the command signal from the light transmission and reception control unit 16. The light receiving signal outputted from the light detector 131 is inputted into the controller (the distance calculation unit 15, the speed determination unit 17).

1-4. Controller 20

The laser distance measuring apparatus 10 is provided with a controller 20. The controller 20 is provided with functional parts, such as the scanning control unit 14, the distance calculation unit 15, the light transmission and reception control unit 16, the speed determination unit 17, and the average power control unit 18. Each function of the controller 20 is realized by processing circuits provided in the controller 20. Specifically, as shown in FIG. 6, the controller 20 is provided, as processing circuits, with an arithmetic processor (computer) 90 such as a CPU (Central Processing Unit), storage apparatuses 91 which exchange data with the arithmetic processor 90, an input and output circuit 92 which inputs and outputs external signals to the arithmetic processor 90, an external communication device 93 which performs data communication with external apparatus of the laser distance measuring apparatus 10, and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatuses 91, there are provided a RAM (Random Access Memory) which can read data and write data from the arithmetic processor 90, a ROM (Read Only Memory) which can read data from the arithmetic processor 90, and the like. As the storage apparatuses 91, various kinds of storage apparatus, such as a flash memory and EEPROM (Electrically Erasable Programmable Read Only Memory) may be used.

The input and output circuit 92 is connected to the laser beam source driving circuit 112, the mirror drive circuit 122, the light detector 131, the light detector control circuit 132, and the like; and is provided with a communication circuit which performs transmission and reception of data and a control command between these and the arithmetic processor 90, an A/D converter, a D/A converter, an input/output port, and the like. The input and output circuit 92 is provided with an arithmetic processor which controls each circuit. The external communication device 93 communicates with the external apparatus 30, such as an automatic driving apparatus.

Then, the arithmetic processor 90 runs software items (programs) stored in the storage apparatus 91 such as a ROM and collaborates with other hardware devices in the controller 20, such as the storage apparatus 91, the input and output circuit 92, and the external communication device 93, so that the respective functions of the functional parts 14 to 18 included in the controller 20 are realized. Setting data items such as a determination speed to be utilized in the functional parts 14 to 18 are stored, as part of software items (programs), in the storage apparatus 91 such as a ROM. Each function of the controller 20 will be described in detail below.

<Light Transmission and Reception Control Unit 16>

The light transmission and reception control unit 16 transmits a command signal to the laser beam source driving circuit 112 to output a pulse form laser beam which has a pulse width PW at the emission period Tp. In the present embodiment, the light transmission and reception control unit 16 outputs the laser beam, based on the pulse width PW and the emission period Tp which are commanded from the average power control unit 18 described below. The light transmission and reception control unit 16 transmits a command signal to the light detector control circuit 132 to output a light receiving signal from the light detector 131.

<Scanning Control Unit 14>

The scanning control unit 14 controls the scanning mechanism 12 to scan the irradiation angle of the laser beam. In the present embodiment, the scanning control unit 14 controls the scanning mechanism 12 to performs a two-dimensional scan which scan the laser beam L1 in an irradiation angle range of the first direction X, and scans the laser beam L1 in an irradiation angle range of the second direction which is orthogonal to the first direction X. The laser beam L1 is irradiated to front of the moving body 1. The first direction X is set to a right and left direction with respect to a traveling direction of the moving body 1. The second direction Y is set to an up and down direction with respect to the traveling direction of the moving body 1. The scanning control unit 14 controls the scanning mechanism 12, based on the irradiation angle range of the first direction X and the second direction Y commanded from the average power control unit 18 described below, and the scanning period.

The scanning control unit 14 transmits the command signal to scan the irradiation angle of the laser beam in the irradiation angle range of the second direction Y at the first period T1, to the mirror drive circuit 122. Specifically, the scanning control unit 14 transmits the command signal of the positive first maximum current value Imx1 and the negative first minimum current value Imn1 of the current supplied to the first coil 121g, and the first period T1, to the mirror drive circuit 122.

And, the scanning control unit 14 transmits the command signal to scan the irradiation angle of the laser beam in the first direction X at the second period T2, to the mirror drive circuit 122. Specifically, the scanning control unit 14 transmits the command signal of the positive second maximum current value Imx2 and the negative second minimum current value Imn2 of the current supplied to the second coil 121i, and the second period T2, to the mirror drive circuit 122. The scanning control unit 14 sets a value obtained by dividing the first period T1 by the reciprocation scanning frequency of the first direction X in one frame, to the second period T2.

As shown in FIG. 5, the irradiation angle of the laser beam L1 is scanned once in the two-dimensional scan field of rectangular shape at the first period T1. This one scan of the two-dimensional scan field is called as one frame. The first period T1 becomes the scanning period.

The scanning control unit 14 transmits information of the irradiation angle of the first direction X and the second direction Y to the distance calculation unit 15, the speed determination unit 17, and the like. In the present embodiment, the supply current of the first coil 121g corresponds to the irradiation angle of the first direction, and the supply current of the second coil 121i corresponds to the irradiation angle of the second direction.

<Distance Calculation Unit 15>

Figure 7:
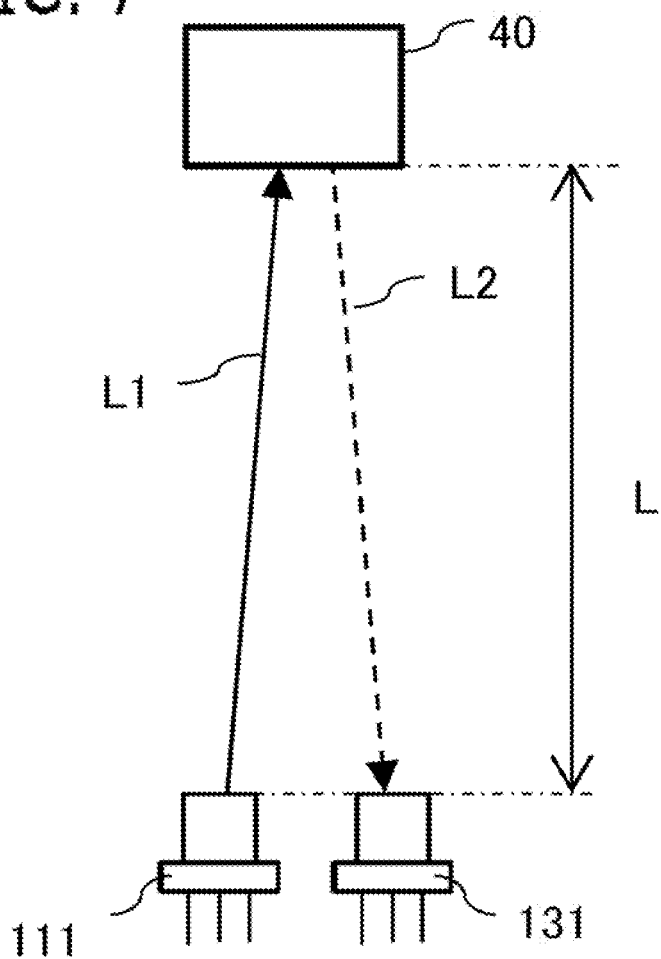
FIG. 7 is a figure for explaining detection of the distance to the body according to Embodiment 1.

The distance calculation unit 15 calculates a distance to the object which exists at the irradiation angle, based on the emitted laser beam and the light receiving signal. As shown in FIG. 7, the laser beam L1 emitted from the laser beam source 111 is reflected by the object 40 which exists ahead by a distance L, and the reflected light L2 enters into the light detector 131 which exists backward by the distance L. FIG. 8 shows the relationship between the beam source signal of the laser beam L1 emitted from the laser beam source 111, and the light receiving signal of the reflected light L2 received by the light detector 131. The time Tcnt from the rising of the beam source signal to the peak of the light receiving signal is time for the laser beam to go and return the distance L between the laser beam source 111 and the light detector 131, and the object 40. Therefore, the distance L to the object 40 can be calculated by multiplying the velocity of light to the time Tcnt, and dividing by 2.

The output signal (beam source signal) from the laser beam source driving circuit 112 to the laser beam source 111 is inputted into the distance calculation unit 15. The distance calculation unit 15 can detect a time point when the laser beam generating unit 11 starts to emit the pulse form laser beam. The distance calculation unit 15 measures, as a light receiving time Tcnt, a time from a time point when the laser beam is emitted to a time point when the light receiving signal exceeds a threshold value. A time measuring device may be used for measurement of the light receiving time Tcnt. The time measuring devices may be a type provided with a ring oscillator and a counter, or may be a type provided with a plurality of delay circuits and flip-flops, and a counter.

Then, the distance calculation unit 15 calculates a value obtained by multiplying the velocity of light c0 to the light receiving time Tcnt, and dividing by 2, as the distance L to the object which exists at the irradiation angle at emitting the laser beam (L=Tcnt×c0/2). When the light receiving unit 13 is not outputting the light receiving signal, the distance calculation unit 15 determines that the object which exists at the irradiation angle at that time cannot be detected, and does not calculate the distance L. The distance calculation unit 15 transmits the calculating result of the object distance at each irradiation angle to the external apparatus 30.

<Speed Determination Unit 17>

The speed determination unit 17 determines whether or not the moving body 1 stops, by comparing the light receiving signals detected at two time points at the same irradiation angle.

When the moving body 1 stops, the laser beams which are irradiated at the two time points at the same irradiation angle are irradiated to the part of the same static object. Since the reflectance of the laser beam is the same and the distance is the same if it is the part of the same static object, the intensities of the reflected lights at the two time points become equivalent, and the light receiving signals at the two time points become equivalent. Accordingly, by comparing the light receiving signals detected at the two time points, it can be determined whether or not the moving body 1 stops.

In the present embodiment, it is configured that the two-dimensional scan is performed, the speed determination unit 17 determines whether or not the moving body 1 stops by comparing the light receiving signals detected in this time scanning period and past scanning period at the same irradiation angle.

Into the speed determination unit 17, the light receiving signal outputted from the light detector 131 is inputted, the beam source signal outputted from the laser beam source driving circuit 112 is inputted, and the information on the irradiation angle outputted from the scanning control unit 14 is inputted. Then, the speed determination unit 17 stores these input information to the storage apparatus, such as RAM. The speed determination unit 17 may store only information after performing preprocessing for determination to the storage apparatus. For example, the speed determination unit 17 stores the light receiving signal waveform with the time base in which the time point of emitting the laser beam (the time point when the beam source signal is turned on) is set to 0, and the corresponding irradiation angle, to the storage apparatus. Alternatively, the speed determination unit 17 may store the light receiving time Tcnt from the time point of emitting the laser beam to the time point when the light receiving signal exceeds the threshold, the peak value Rmax of the light receiving signal, the pulse width Rw of the light receiving signal which is a time interval when the light receiving signal exceeds the threshold, and the like, to the storage apparatus.

Figure 9:
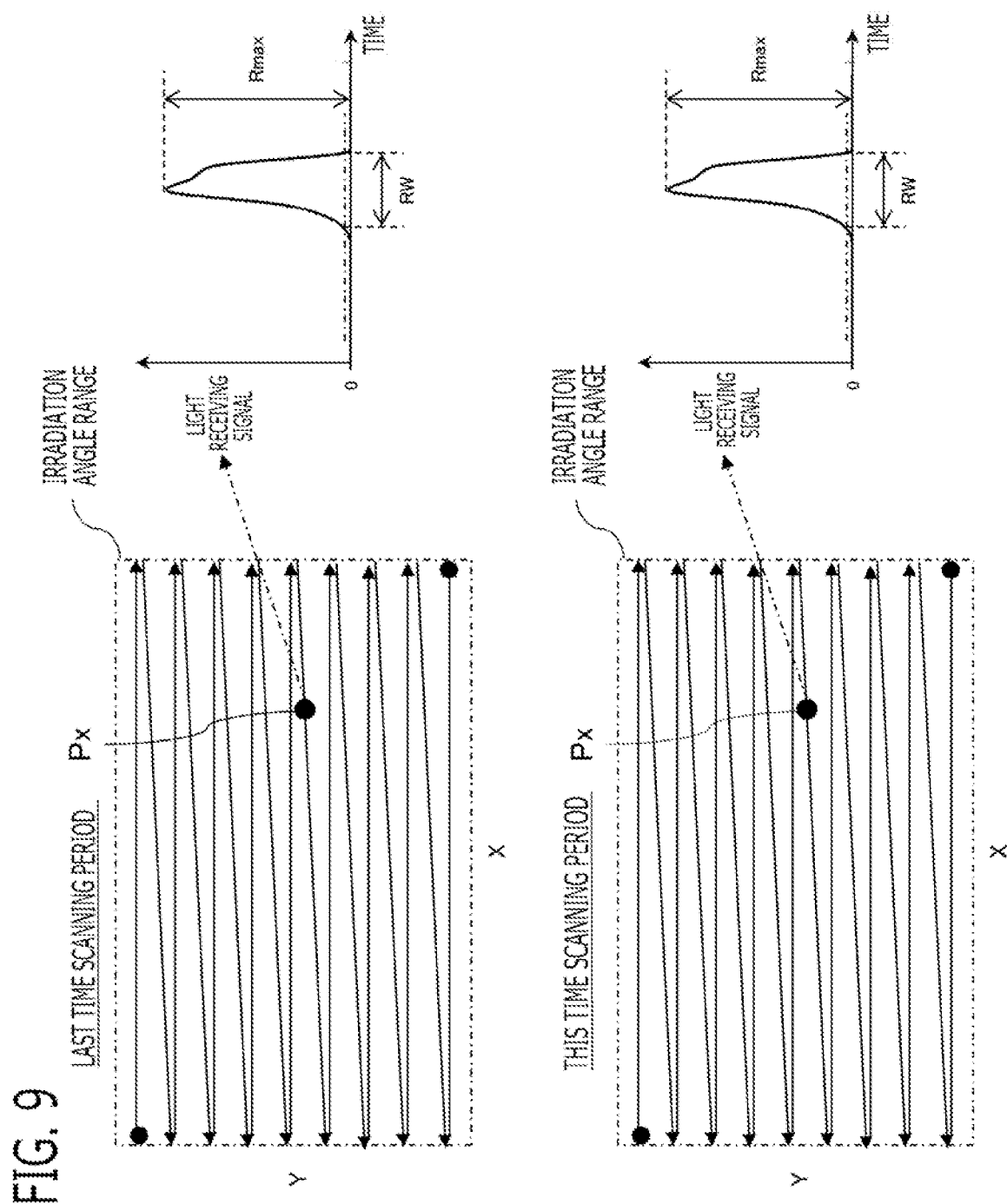
FIG. 9 is a figure for explaining stop determination of the moving body according to Embodiment 1.

FIG. 9 shows the light receiving signals detected in this time scanning period and the last time scanning period at the determination irradiation angle Px which is set to the determined irradiation angle, when the moving body 1 stops. The left side of FIG. 9 shows the irradiation angle range of this time and the last time scanning period, and the set angle of the determination irradiation angle Px in the irradiation angle range. The right side of FIG. 9 shows the waveform near the peak value of the light receiving signal obtained at the determination irradiation angle Px in this time and the last time scanning period. In the time base of the light receiving signal waveform obtained at each irradiation angle, the time point of emitting the laser beam (in this example, the time point when the beam source signal is turned on) is set to basis (0).

As shown in FIG. 9, the light receiving signals detected at the two time points at the same determination irradiation angle Px are equivalent, and the speed determination unit 17 determines that the moving body 1 stops.

When a difference of two light receiving signals detected at the same irradiation angle is less than or equal to a preliminarily set stop determination value, the speed determination unit 17 determines that the moving body 1 stops, and otherwise, the speed determination unit 17 determines that the moving body 1 does not stop.

For example, using two light receiving signal waveforms with the time base in which the time point of emitting the laser beam is set to 0, the speed determination unit 17 calculates a deviation (absolute value) between two light receiving signal waveforms at each time point. When an integration value of the deviations is less than or equal to the stop determination value, the speed determination unit 17 determines that the moving body 1 stops, and otherwise, the speed determination unit 17 determines that the moving body 1 does not stop.

Alternatively, when one or both of a difference of the peak values Rmax and a difference of the pulse widths Rw of two light receiving signals detected at the same irradiation angle are less than or equal to preliminarily set stop determination values of respective differences, the speed determination unit 17 may determine that the moving body 1 stops, and otherwise, the speed determination unit 17 may determine that the moving body 1 does not stop. Alternatively, when one or both of the difference of the peak values Rmax and the difference of the pulse widths Rw, and a difference of the light receiving times Tcnt of two light receiving signals are less than or equal to preliminarily set stop determination values of respective differences, the speed determination unit 17 may determine that the moving body 1 stops, and otherwise, the speed determination unit 17 may determine that the moving body 1 does not stop. Instead of the light receiving time Tcnt, the distance calculated based on the light receiving time Tcnt may be used.

Figure 10:
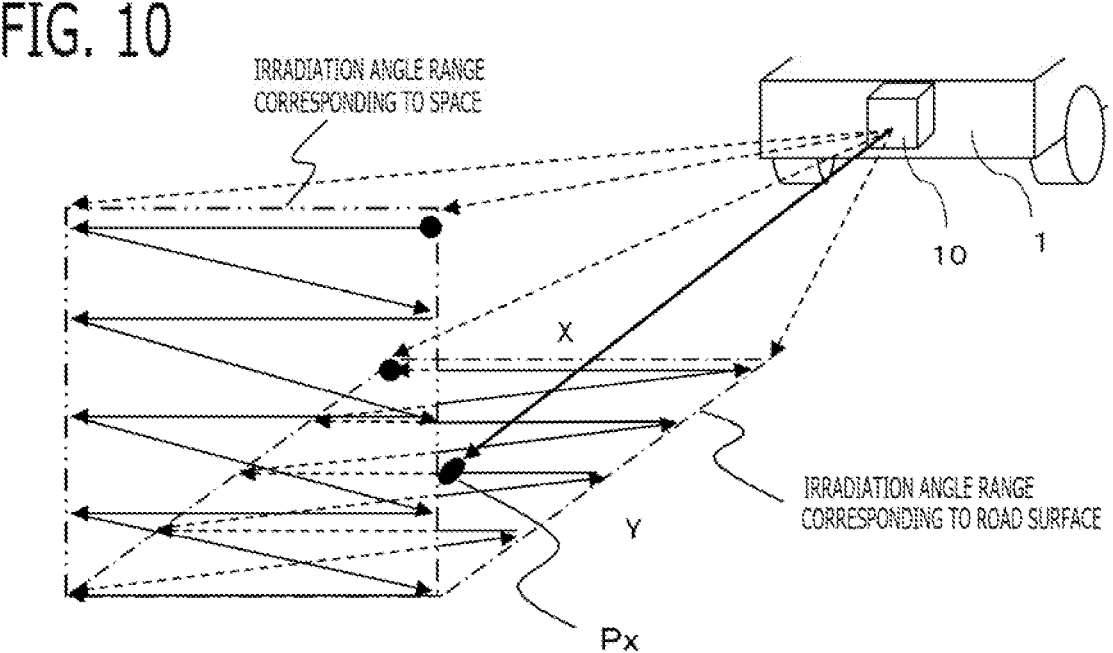
FIG. 10 is a figure for explaining stop determination of the moving body according to Embodiment 1.

As shown in FIG. 10, the determination irradiation angle Px may be set to the irradiation angle range where the laser beam is irradiated to a road surface. Since the road surface is a stationary object and has irregularity, reflectance is different depending on each part of the road surface, and it can be determined with good accuracy whether or not the moving body 1 stops.

For example, the determination irradiation angle Px may be preliminarily set to the irradiation angle at which the laser beam is irradiated to the road surface in the usual traveling of the moving body 1. Alternatively, the speed determination unit 17 may determine the irradiation angle range corresponding to the road surface based on each irradiation angle and the distance detected at each irradiation angle, and may set the determination irradiation angle Px to the determined irradiation angle range corresponding to the road surface. If the detection object is the road surface, the relationship between each irradiation angle and the distance detected at each irradiation angle becomes a prescribed relation in which the distance becomes long as the irradiation angle changes to the up side. Accordingly, the irradiation angle range in which the actual relation is corresponding to the relation of the road surface may be determined to be the irradiation angle range corresponding to the road surface.

Alternatively, the determination irradiation angle Px may be set to the irradiation angle range where the laser is irradiated to a stationary object other than the road surface. For example, similar to Embodiment 6, using well-known processing technology, shape and relative velocity of the detection object are recognized based on each irradiation angle and the distance of each irradiation angle, and the road surface and the stationary object other than the road surface are recognized based on the shape and the relative velocity of the detection object.

The speed determination unit 17 may set a plurality of determination irradiation angles, compare the light receiving signals detected at two time points at each determination irradiation angle, and determine whether or not the moving body 1 stops. When the number of the determination irradiation angles determined that the moving body 1 stops is greater than or equal to a preliminarily set stop determination number, the speed determination unit 17 may finally determine that the moving body 1 stops, and otherwise, the speed determination unit 17 may determine that the moving body 1 does not stop. A plurality of determination irradiation angles may be set to the irradiation angle range corresponding to the road surface.

<Average Power Control Unit 18>

When it is determined that the moving body 1 stops by the speed determination unit 17, the average power control unit makes an average power per unit area and unit time of the laser beam emitted from the laser beam generating unit 11 lower than that of when it is determined that the moving body 1 does not stop.

The average power control unit 18 lowers the average power by performing any one or more of 1) a pulse width shortening that makes the pulse width PW of the laser beam emitted from the laser beam generating unit 11 short, 2) a peak power drop that makes the peak power of the laser beam emitted from the laser beam generating unit 11 lower, and 3) an emission period extension that makes the emission period Tp of the laser beam emitted from the laser beam generating unit 11 long. 2) The peak power drop is performed by lowering the supply voltage supplied to the laser beam source by the DC/DC converter and the like.

For example, the average power control unit 18 transmits commands of the pulse width PW of the laser beam, the supply voltage to the laser beam source, and the emission period Tp, to the light transmission and reception control unit 16. The light transmission and reception control unit 16 makes the laser beam emit from the laser beam generating unit 11 based on the pulse width PW, the supply voltage, and the emission period Tp which were commanded. For example, in the case of changing the pulse width, the average power control unit 18 commands a pulse width at normal time to the light transmission and reception control unit 16, when it is determined that the moving body 1 does not stop, and commands a pulse width at stopping time shorter than the pulse width at normal time to the light transmission and reception control unit 16, when it is determined that the moving body 1 does not stop. In the case of changing the supply voltage, the average power control unit 18 commands a supply voltage at normal time to the light transmission and reception control unit 16, when it is determined that the moving body 1 does not stop, and commands a supply voltage at stopping time lower than the supply voltage at normal time to the light transmission and reception control unit 16, when it is determined that the moving body 1 stops. In the case of changing the emission period, the average power control unit 18 commands an emission period at normal time to the light transmission and reception control unit 16, when it is determined that the moving body 1 does not stop, and commands an emission period at stopping time longer than the emission period at normal time to the light transmission and reception control unit 16, when it is determined that the moving body 1 stops.

<Flowchart>

Figure 11:
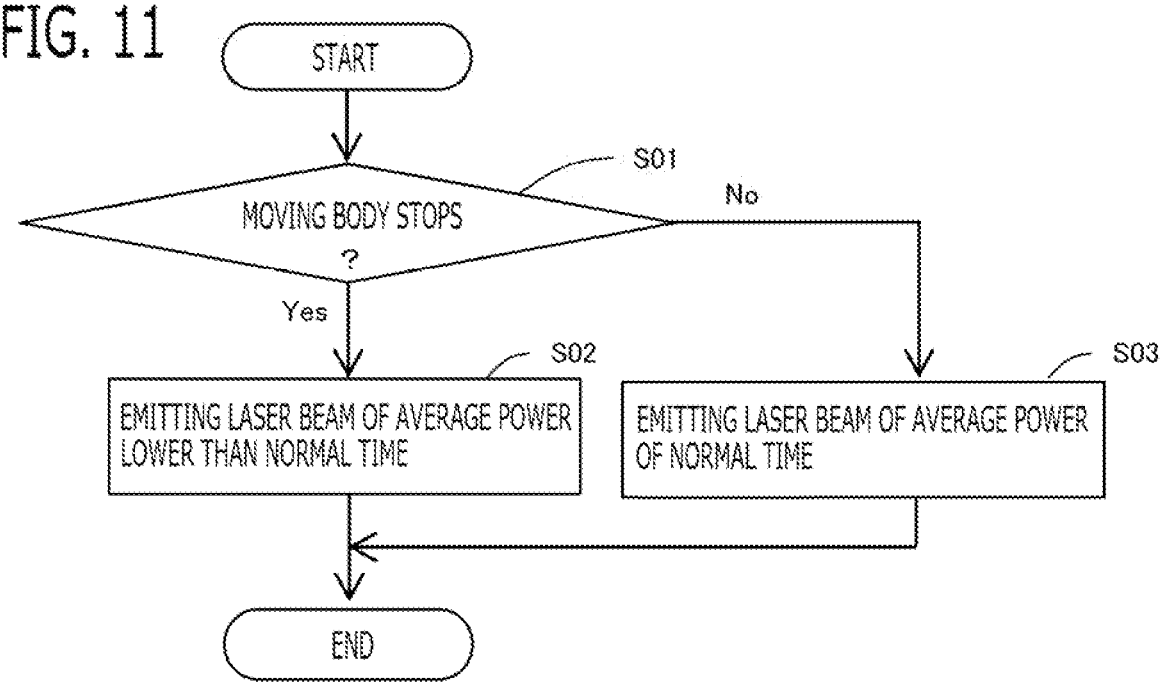
FIG. 11 is a flowchart for explaining processing of the speed determination unit and the average power control unit according to Embodiment 1.

FIG. 11 shows the flowchart explaining processing of the speed determination unit 17 and the average power control unit 18. Processing of FIG. 11 is performed every scanning period. In the step S01, as mentioned above, the speed determination unit 17 determines whether or not the moving body 1 stops by comparing the light receiving signals detected in this time scanning period and past scanning period at the same irradiation angle. The speed determination unit 17 advances to the step S02, when it is determined that the moving body 1 stops, and advances to the step S03, when it is determined that the moving body 1 does not stop.

In the step S02, the average power control unit 18 makes the laser beam generating unit 11 emit the laser beam of average power lower than the average power at normal time. On the other hand, in the step S03, the average power control unit 18 makes the laser beam generating unit 11 emit the laser beam of average power at normal time.

2. Embodiment 2

Next, the laser distance measuring apparatus 10 according to Embodiment 2 will be explained. The explanation for constituent parts the same as those in Embodiment 1 will be omitted. The basic configuration of the laser distance measuring apparatus 10 according to the present embodiment is the same as that of Embodiment 1. However, Embodiment 2 is different from Embodiment 1 in that a slow speed determination of the moving body 1 is performed in addition to the stop determination of the moving body 1, and the average power of a laser beam is lowered also when determined as the slow speed.

In the present embodiment, as similar to Embodiment 1, the speed determination unit 17 determines whether or not the moving body 1 stops, by comparing the light receiving signals detected at two time points at the same irradiation angle.

<Determination of Two Irradiation Angles at which Light Receiving Intensities Correspond>

In the present embodiment, when it is not determined that the moving body 1 stops, the speed determination unit 17 calculates the speed of the moving body, and determines whether or not the speed of the moving body is less than or equal to a preliminarily set determination speed. Specifically, the speed determination unit 17 determines this time determination angle Px2 which is an irradiation angle in this time scanning period and past determination angle Px1 which is an irradiation angles in the past scanning period at which the light receiving intensities of the light receiving signals correspond to each other, between the light receiving signals detected in this time scanning period and the light receiving signals detected in the past scanning period.

Figure 12:
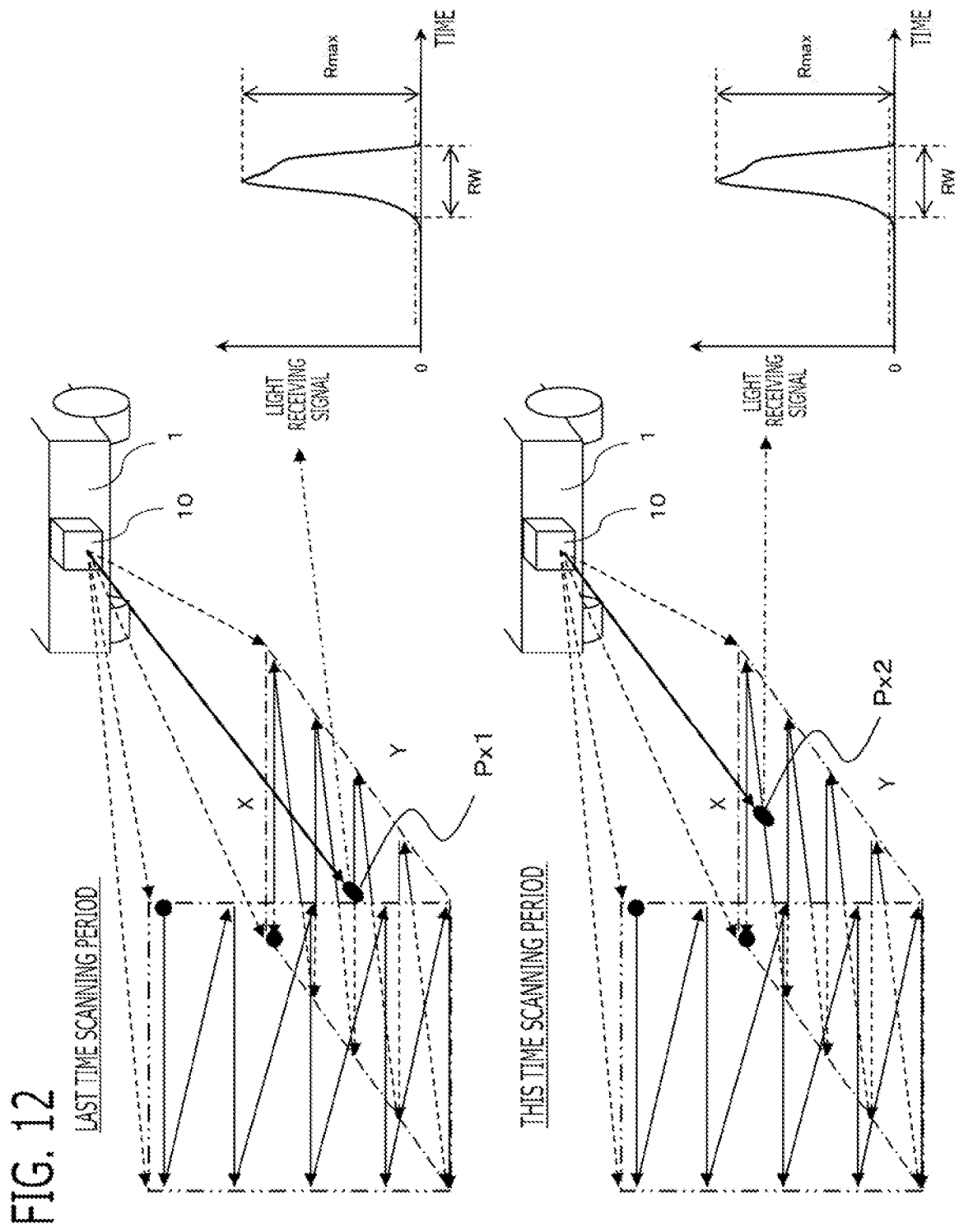
FIG. 12 is a figure for explaining the stop determination of the moving body and the slow speed determination according to Embodiment 2.

For example, as shown in the upper row of FIG. 12, the speed determination unit 17 sets the light receiving signal detected at the past determination angle Px1 which is set to a predetermined irradiation angle in the last time scanning period, to a comparison source. Then, as shown in the lower row of FIG. 12, from the light receiving signals of a plurality of irradiation angles detected in this time scanning period, the speed determination unit 17 searches for the light receiving signal which has the light receiving intensity corresponding to the light receiving intensity of the light receiving signal detected at the past determination angle Px1 in the last time scanning period. When there is a corresponding light receiving signal, the speed determination unit 17 determines the irradiation angle of its light receiving signal as this time determination angle Px2. When there are a plurality of corresponding irradiation angles, an irradiation angle with the highest correspondence degree may be determined as this time determination angle Px2.

In the present embodiment, as shown in FIG. 12, the scanning direction of the laser beam is set to the direction which approaches from the front of the moving body 1 to the moving body 1. As similar to Embodiment 1, the speed determination unit 17 determines whether or not the moving body 1 stops, by comparing the light receiving signal detected at the past determination angle Px1 in the last time scanning period with the light receiving signal detected at the same irradiation angle as the past determination angle Px1 in this time scanning period. Then, when it is determined that the moving body 1 does not stop, the speed determination unit 17 compares, in order of the scan, the light receiving intensity of the light receiving signal detected at each irradiation angle after the past determination angle Px1 in this time scanning period, with the light receiving intensity of the light receiving signal detected at the past determination angle Px1 in the last time scanning period, and determines whether or not the light receiving intensities correspond. Then, when it is determined that the light receiving intensities correspond, the speed determination unit 17 determines its irradiation angle as this time determination angle Px2, and ends the comparison in order of the scan.

Alternatively, the comparison source and the comparison destination may be reversed. That is to say, the speed determination unit 17 may set the light receiving signal detected at this time determination angle Px2 which is set to a predetermined irradiation angle in this time scanning period, to a comparison source. Then, from the light receiving signals of a plurality of irradiation angles detected in the last time scanning period, the speed determination unit 17 may search for the light receiving signal which has the light receiving intensity corresponding to the light receiving intensity of the light receiving signal detected at the this time determination angle Px2 in this time scanning period. When there is a corresponding light receiving signal, the speed determination unit may determine the irradiation angle of its light receiving signal as the past determination angle Px1.

And, in the present embodiment, when the moving body 1 is moving forward, between the past determination angle Px1 and this time determination angle Px2 at which the light receiving intensities correspond to each other, the angles of the second direction Y (the up and down direction Y) are different, but the angles of the first direction X (the right and left direction X) are equivalent. Accordingly, the speed determination unit 17 may limit the irradiation angle range of the right and left direction X where the light receiving intensities are compared between this time scanning period and the last time scanning period, to a predetermined range. According to this configuration, it is not determined erroneously that the light receiving intensities of the past determination angle Px1 and this time determination angle Px2 which have a large angular difference in the right and left direction X correspond to each other, and determination accuracy can be improved. The compared range of the right and left direction is narrowed, and processing load can be reduced.

As the comparison of the light receiving intensities of two light receiving signals, for example, the speed determination unit 17 uses two light receiving signal waveforms with the time base in which the time point when the light receiving signal exceeds the threshold value is set to 0, and calculates a deviation (absolute value) of two light receiving signals at each time point after time 0; then, when an integration value of the deviations is less than or equal to an intensity determination value, the speed determination unit 17 determines that the light receiving intensities of two light receiving signals correspond, and otherwise, the speed determination unit 17 determines that the light receiving intensities of two light receiving signals does not correspond.

Alternatively, when one or both of a difference of peak value Rmax and a difference of the pulse width Rw of two light receiving signals are less than or equal to preliminarily set intensity determination values of respective differences, the speed determination unit 17 may determine that the light receiving intensities of two light receiving signals correspond, and otherwise, determine that the light receiving intensities of two light receiving signals does not correspond.

<Calculation of Moving Body Speed>

Figure 13:
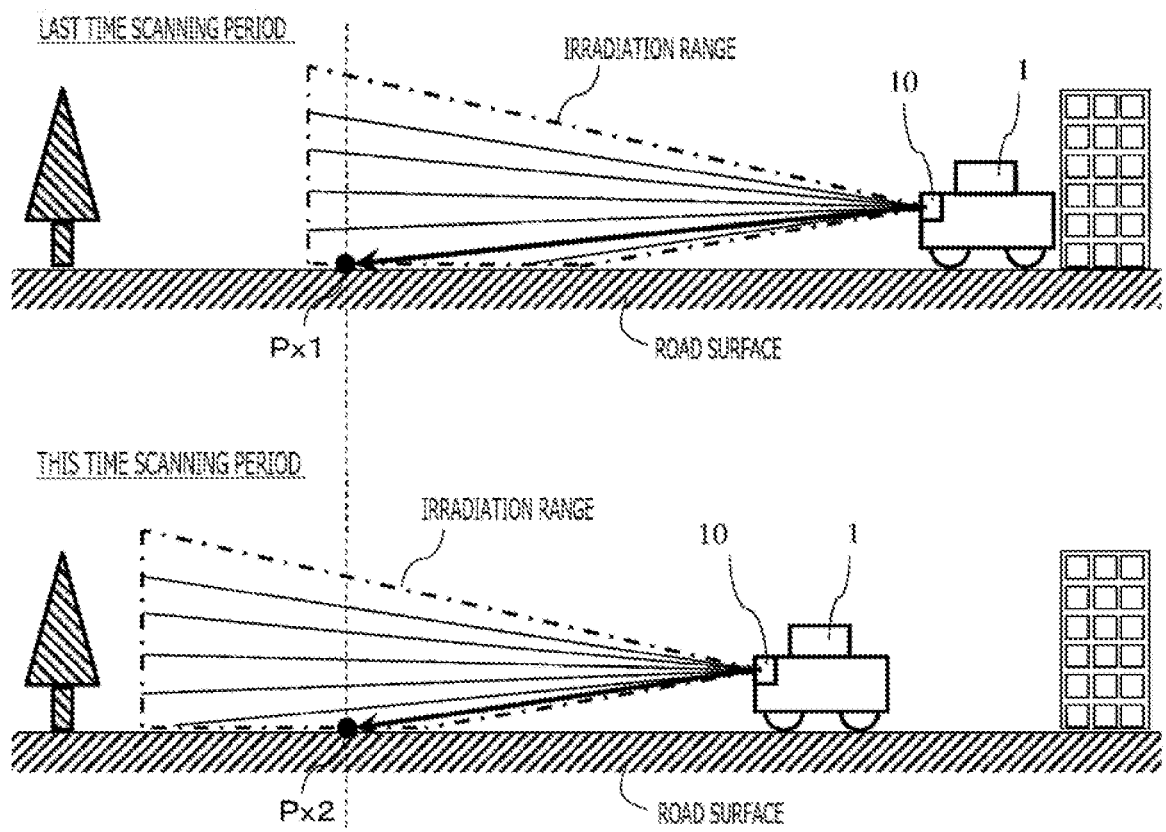
FIG. 13 is a figure for explaining the stop determination of the moving body and the slow speed determination according to Embodiment 2.
Figure 14:
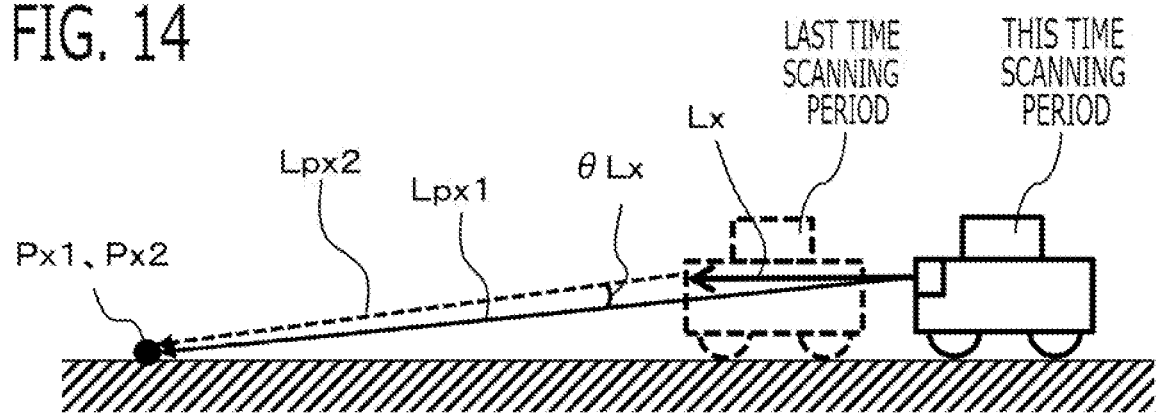
FIG. 14 is a figure for explaining calculation of the moving distance of the moving body according to Embodiment 2.

In the example shown in FIG. 12, the moving body 1 is moving, and this time determination angle Px2 of this time scanning period and the past determination angle Px1 of the last time scanning period at which light receiving intensities correspond to each other are different. And, between this time determination angle Px2 and the past determination angle Px1, the irradiation angles of the right and left direction X are equivalent, but the irradiation angles of the up and down direction Y are different. FIG. 13 shows the schematic diagram viewing the example of FIG. 12 from one side of the right and left direction X. The upper row of FIG. 13 corresponds to the last time scanning period, and the lower row of FIG. 13 corresponds to this time scanning period. FIG. 14 shows the figure superposed with the upper row and the lower row of FIG. 13.

As shown in FIG. 14, the moving distance Lx of the moving body 1 from the irradiating time point of the past determination angle Px1 to the irradiating time point of this time determination angle Px2 can be calculated by the geometric relationship which is based on the past determination angle Px1, the distance calculated at the past determination angle Px1 (hereinafter, referred to as the past determination distance Lpx1), this time determination angle Px2, and the distance calculated at this time determination angle Px2 (hereinafter, referred to as this time determination distance Lpx2).

Specifically, the moving distance Lx can be calculated by a next equation.

$$Lx=\{Lpx1^2+Lpx2^2-2\times Lpx1\times Lpx2\times \cos(\theta Lx)\}^{1/2} \quad (1)$$

Herein, θLx is the angular difference between the irradiation angle of the up and down direction Y of the past determination angle Px1, and the irradiation angle of the up and down direction Y of this time determination angle Px2. The angular difference θLx may be the angular difference considered the up and down direction Y and the right and left direction X.

Since the angular difference θLx between the past determination angle Px1 and this time determination angle Px2 is small, if the angular difference θLx is approximated to 0, the moving distance Lx can be calculated by a next equation. That is to say, the moving distance Lx can be approximately calculated by the difference between the past determination distance Lpx1 and this time determination distance Lpx2.

$$Lx \approx Lpx1-Lpx2 \quad (2)$$

Then, as shown in a next equation, by dividing the moving distance Lx by the time difference Tx between the irradiating time point of this time determination angle and the irradiating time point of the past determination angle, the moving body speed Vx can be calculated.

$$Vx=Lx/Tx \quad (3)$$

Then, the speed determination unit 17 calculates the moving distance Lx of the moving body 1 from the irradiating time point of the past determination angle Px1 to the irradiating time point of this time determination angle Px2, based on this time determination distance Lpx2 which is the distance calculated by the distance calculation unit 15 at this time determination angle Px2, and the past determination distance Lpx1 which is the distance calculated by the distance calculation unit 15 at the past determination angle Px1. The equation (2) can be used for this calculation of the moving distance Lx, for example.

In order to increase the calculation accuracy of the moving distance Lx, the speed determination unit 17 may calculate the moving distance Lx, based on the past determination angle Px1 and this time determination angle Px2 in addition to this time determination distance Lpx2 and the past determination distance Lpx1.

The speed determination unit 17 calculates the moving body speed Vx, based on the moving distance Lx and the time difference Tx between the irradiating time point of this time determination angle Px2 and the irradiating time point of the past determination angle Px1. The equation (3) is used for this calculation of the speed Vx, for example. For example, by calculating a number of emitting times of the laser beam between the past determination angle Px1 and this time determination angle Px2, and multiplying an emission time interval to the number of emitting times, the time difference Tx is calculated. Alternatively, period from the irradiating time point of the past determination angle Px1 to the irradiating time point of this time determination angle Px2 may be measured by the timer.

Then, the speed determination unit 17 determines whether or not the moving body speed Vx is less than or equal to the preliminarily set determination speed.

<Average Power Control Unit 18>

When it is determined that the moving body 1 stops or it is determined that the moving body speed Vx is less than or equal to the determination speed by the speed determination unit 17, the average power control unit 18 makes the average power of the laser beam lower than other cases. Since the method of lowering the average power is the same as that of Embodiment 1, explanation is omitted.

<Flowchart>

Figure 15:
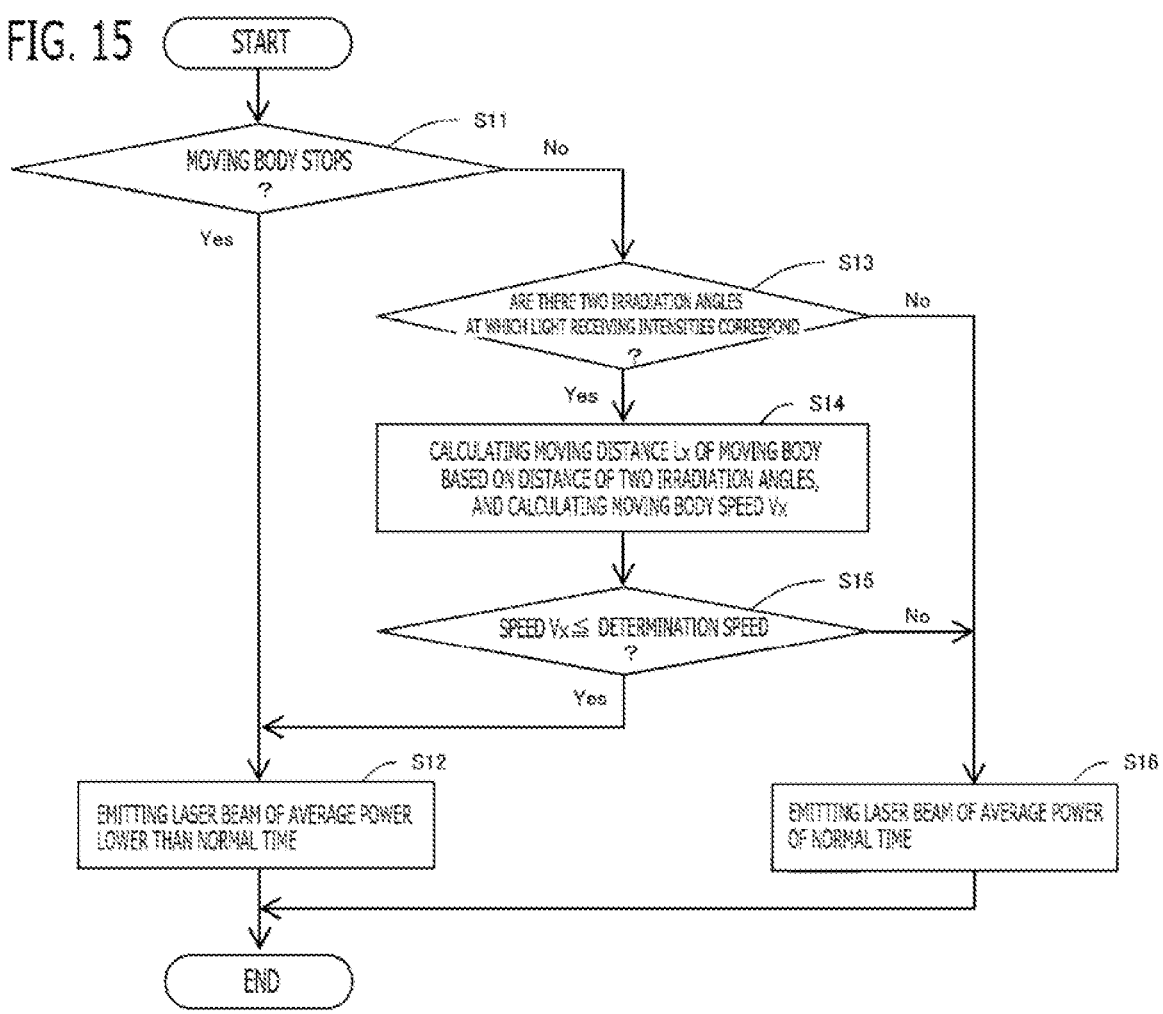
FIG. 15 is a flowchart for explaining processing of the speed determination unit and the average power control unit according to Embodiment 2.

FIG. 15 shows the flowchart explaining processing of the speed determination unit 17 and the average power control unit 18. In the step S11, as mentioned above, the speed determination unit 17 determines whether or not the moving body 1 stops by comparing the light receiving signals detected in this time scanning period and past scanning period at the same irradiation angle. The speed determination unit 17 advances to the step S12, when it is determined that the moving body 1 stops, and advances to the step S13, when it is determined that the moving body 1 does not stop.

In the step S13, the speed determination unit 17 determines this time determination angle Px2 which is an irradiation angle in this time scanning period and past determination angle Px1 which is an irradiation angles in the past scanning period at which the light receiving intensities of the light receiving signals correspond to each other, between the light receiving signals detected in this time scanning period and the light receiving signals detected in the past scanning period. The speed determination unit 17 advances to the step S14, when there are this time determination angle Px2 and the past determination angle Px1 at which the light receiving intensities correspond to each other, and advances to the step S16, when there is no corresponding angles.

In the step S14, as mentioned above, the speed determination unit 17 calculates the moving distance Lx of the moving body 1 from the irradiating time point of the past determination angle Px1 to the irradiating time point of this time determination angle Px2, based on this time determination distance Lpx2 calculated by the distance calculation unit 15 at this time determination angle Px2, and the past determination distance Lpx1 calculated by the distance calculation unit 15 at the past determination angle Px1. The speed determination unit calculates the moving body speed Vx, based on the moving distance Lx and the time difference Tx between the irradiating time point of this time determination angle Px2 and the irradiating time point of the past determination angle Px1. After that, in the step S15, the speed determination unit 17 determines whether or not the moving body speed Vx is less than or equal to the preliminarily set determination speed. The speed determination unit 17 advances to the step S12, when the moving body speed Vx is less than or equal to the determination speed, and advances to the step S16, when the moving body speed Vx is not less than or equal to determination speed.

In the step S12, the average power control unit 18 makes the laser beam generating unit 11 emit the laser beam of average power lower than the average power at normal time. On the other hand, in the step S16, the average power control unit 18 makes the laser beam generating unit 11 emit the laser beam of average power at normal time.

3. Embodiment 3

Next, the laser distance measuring apparatus 10 according to Embodiment 3 will be explained. The explanation for constituent parts the same as those in each of Embodiments 1 and 2 will be omitted. The basic configuration of the laser distance measuring apparatus 10 according to the present embodiment is the same as that of Embodiments 1 and 2. However, Embodiment 3 is different from Embodiments 1 and 2 in that the light receiving signals are compared about a plurality of irradiation angles, and the speed information of the moving body is determined.

In the present embodiment, as similar to Embodiment 1, the speed determination unit 17 determines whether or not the moving body 1 stops, by comparing the light receiving signals detected at two time points at the same irradiation angle. The speed determination unit 17 determines whether or not the moving body 1 stops, by comparing the light receiving signals detected at two time points at each of a plurality of irradiation angles.

The speed determination unit 17 determines this time determination angles Px2 which are a plurality of irradiation angles in this time scanning period and past determination angles Px1 which are a plurality of irradiation angles in the past scanning period at which the light receiving intensities of the light receiving signals correspond to each other, between the light receiving signals detected in this time scanning period and the light receiving signals detected in the past scanning period.

Figure 16:
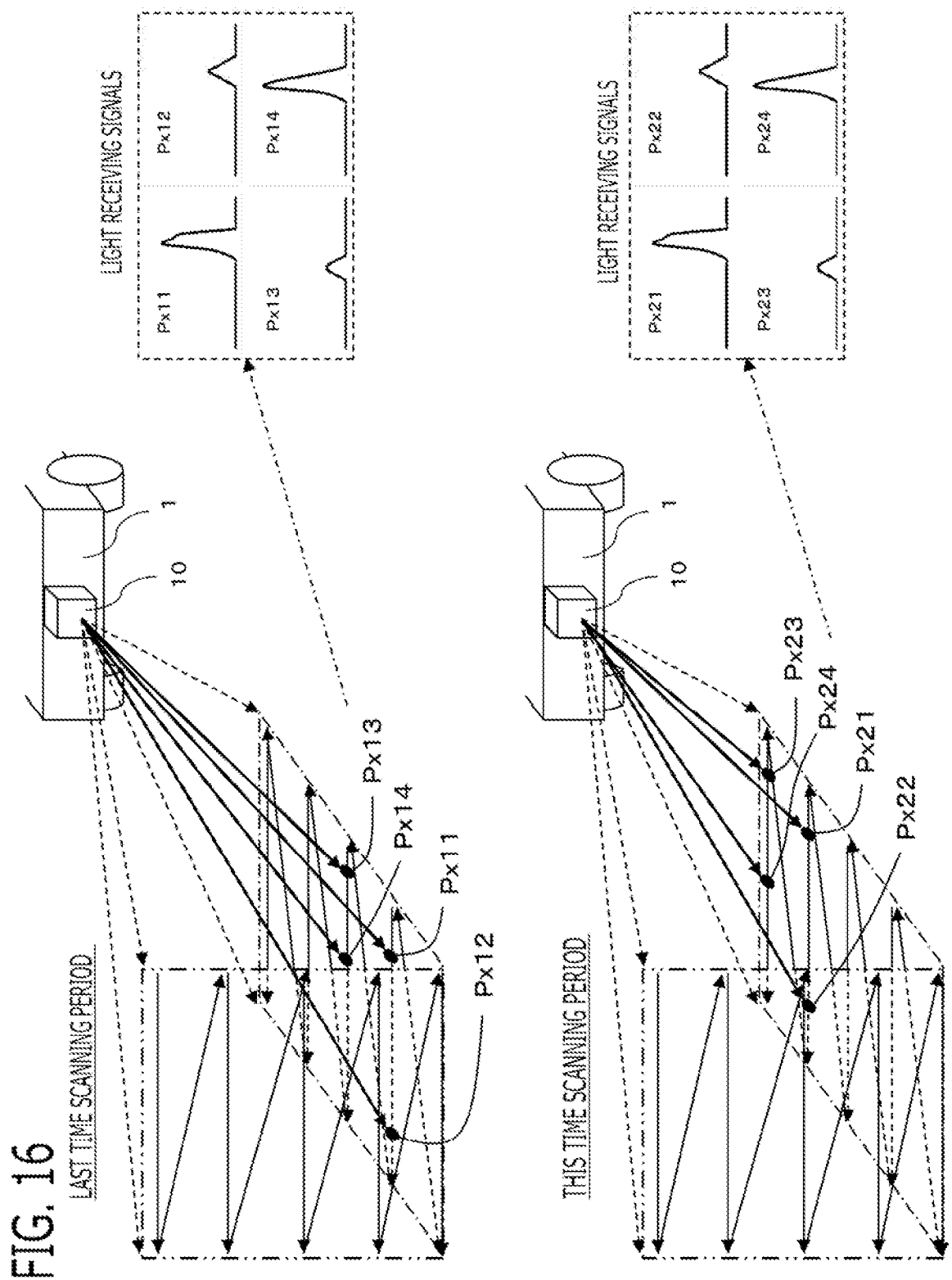
FIG. 16 is a figure for explaining the stop determination of the moving body and the slow speed determination according to Embodiment 3.
Figure 17:
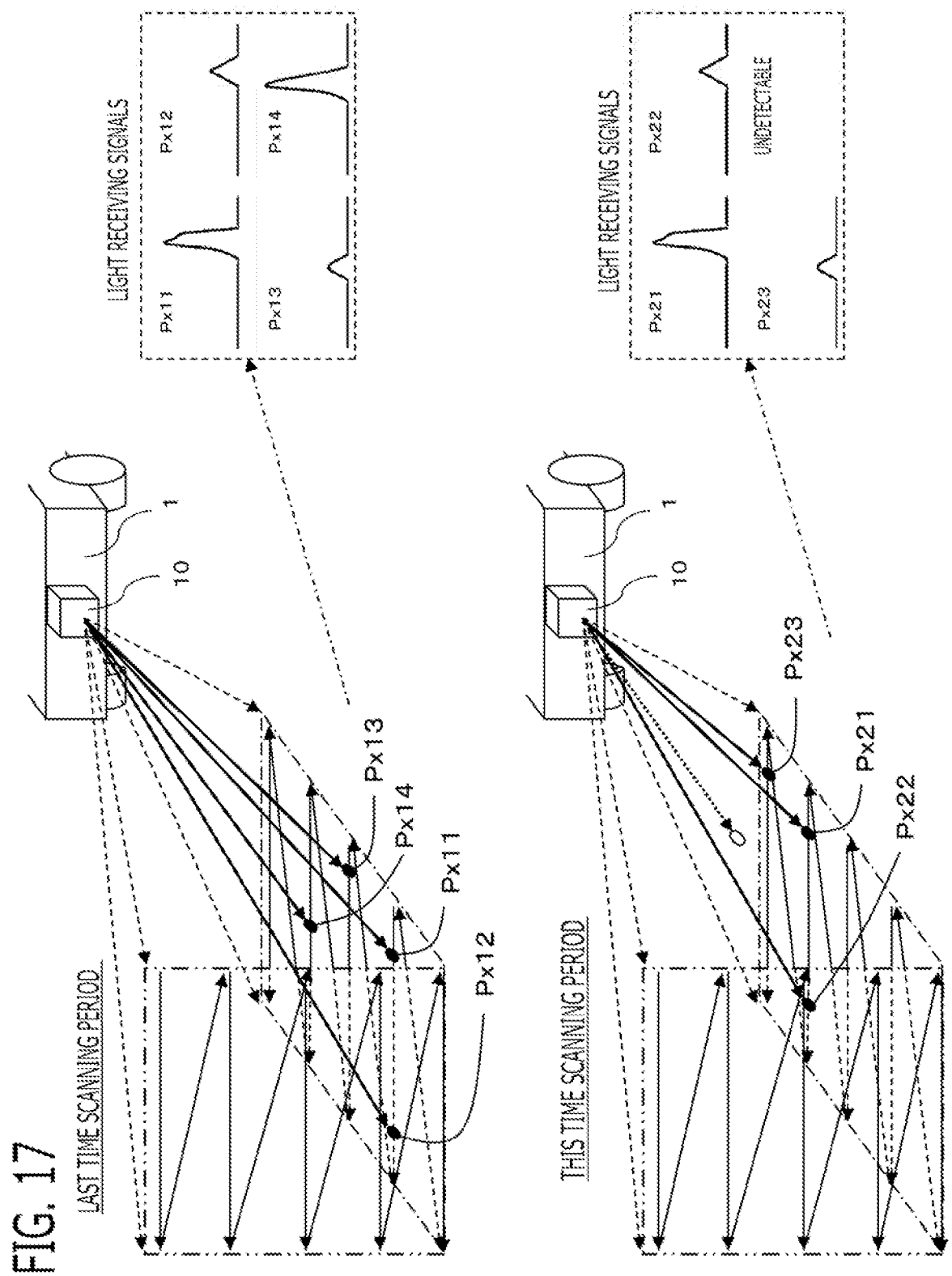
FIG. 17 is a figure for explaining the stop determination of the moving body and the slow speed determination according to Embodiment 3.

For example, as shown in the upper rows of FIG. 16 and FIG. 17, the speed determination unit 17 sets the light receiving signals detected at a plurality of past determination angles Px11, Px12, which are set to predetermined mutually different irradiation angles in the last time scanning period, to comparison sources. Then, as shown in the lower rows of FIG. 16 and FIG. 17, from the light receiving signals of a plurality of irradiation angles detected in this time scanning period, the speed determination unit 17 searches for the light receiving signal which has the light receiving intensity corresponding to the light receiving intensity of the light receiving signal detected at each of a plurality of the past determination angles Px11, Px12, . . . in the last time scanning period. When there are corresponding light receiving signals, the speed determination unit 17 determines the irradiation angles of those light receiving signals, as this time determination angles Px21, Px22, . . . corresponding to respective the past determination angles Px11, Px12, . . . .

In the present embodiment, as shown in FIG. 16 and FIG. 17, the scanning direction of the laser beam is set to the direction which approaches from the front of the moving body 1 to the moving body 1. As similar to Embodiment 1, the speed determination unit 17 determines whether or not the moving body 1 stops, by comparing the light receiving signal detected at each of a plurality of past determination angles Px11, Px12, . . . in the last time scanning period with the light receiving signal detected at the same irradiation angle as each of a plurality of past determination angles Px12, Px12, . . . in this time scanning period. In the example of FIG. 16 and FIG. 17, mutually different four past determination angles Px11, Px12, Px13, Px14 are set in the irradiation angle range corresponding to the road surface. For example, the speed determination unit 17 finally determines that the moving body 1 stops, when there are determination number (for example, majority) or more of the irradiation angles which are determined that the moving body 1 stops, and finally determines that the moving body 1 does not stop, when there is no determination number or more of the irradiation angles. In the example of FIG. 16 and FIG. 17, since there is no irradiation angle determined that the moving body 1 stops, it is finally determined that the moving body 1 does not stop.

Then, when it is determined that the moving body 1 does not stop, the speed determination unit 17 compares, in order of the scan, the light receiving intensity of the light receiving signal detected at each irradiation angle after each of a plurality of the past determination angles Px11, Px12, . . . in this time scanning period with the light receiving intensity of the light receiving signal detected at each of a plurality of the past determination angles Px11, Px12, . . . in the last time scanning period, and determines whether or not the light receiving intensities correspond. Then, when it is determined that the light receiving intensities correspond, the speed determination unit 17 determines its irradiation angle as this time determination angle corresponding to its past determination angle. When there are a plurality of corresponding irradiation angles, an irradiation angle with the highest correspondence degree may be determined as this time determination angle. The speed determination unit 17 may determine that the moving body speed can be calculated, when there are determination number (for example, majority) or more of this time determination angles determined that correspond to a plurality of past determination angles Px11, Px12, . . . , and determine that the moving body speed cannot be calculated, when there is no determination number or more of this time determination angles. In the example of FIG. 16, since it is determined that there are four this time determination angles Px21, Px22, Px23, Px24 which correspond to all four past determination angles Px11, Px12, Px13, Px14, and it is greater than or equal to two which is the majority, it is determined that the moving body speed can be calculated. In the example of FIG. 17, since it is determined that there are three this time determination angles Px21, Px22, Px23 which correspond to three past determination angles Px11, Px12, Px13, and it is greater than or equal to two which is the majority, it is determined that the moving body speed can be calculated.

About each of the past determination angles and this time determination angles which are determined that the light receiving intensities correspond to each other, the speed determination unit 17 calculates the moving body speed Vx by the same method as Embodiment 2. Then, the speed determination unit 17 determines whether or not an average value of the moving body speeds Vx is less than or equal to the preliminarily set determination speed. In this way, since the light receiving signals are compared about a plurality of the irradiation angles, and the speed information of the moving body is determined, determination accuracy can be improved.

4. Embodiment 4

Next, the laser distance measuring apparatus 10 according to Embodiment 4 will be explained. The explanation for constituent parts the same as those in each of Embodiments 1 and 2 will be omitted. The basic configuration of the laser distance measuring apparatus 10 according to the present embodiment is the same as that of Embodiments 1 and 2. However, Embodiment 4 is different from Embodiments 1 and 2 in that the light receiving signals are compared about the irradiation angle region, and the speed information of the moving body is determined.

In the present embodiment, as similar to Embodiment 1, the speed determination unit 17 determines whether or not the moving body 1 stops, by comparing the light receiving signals detected at two time points at the same irradiation angle. The speed determination unit 17 determines whether or not the moving body 1 stops, by comparing the light receiving signals detected at two time points at each of a plurality of irradiation angles included in a preliminarily set irradiation angle region.

The speed determination unit 17 determines this time determination region Pr2 which is an irradiation angle region of this time scanning period and past determination region Pr1 which is an irradiation angle region of the past scanning period in which the light receiving intensities of the light receiving signals correspond to each other, between the light receiving signals detected in this time scanning period and the light receiving signals detected in the past scanning period.

Figure 18:
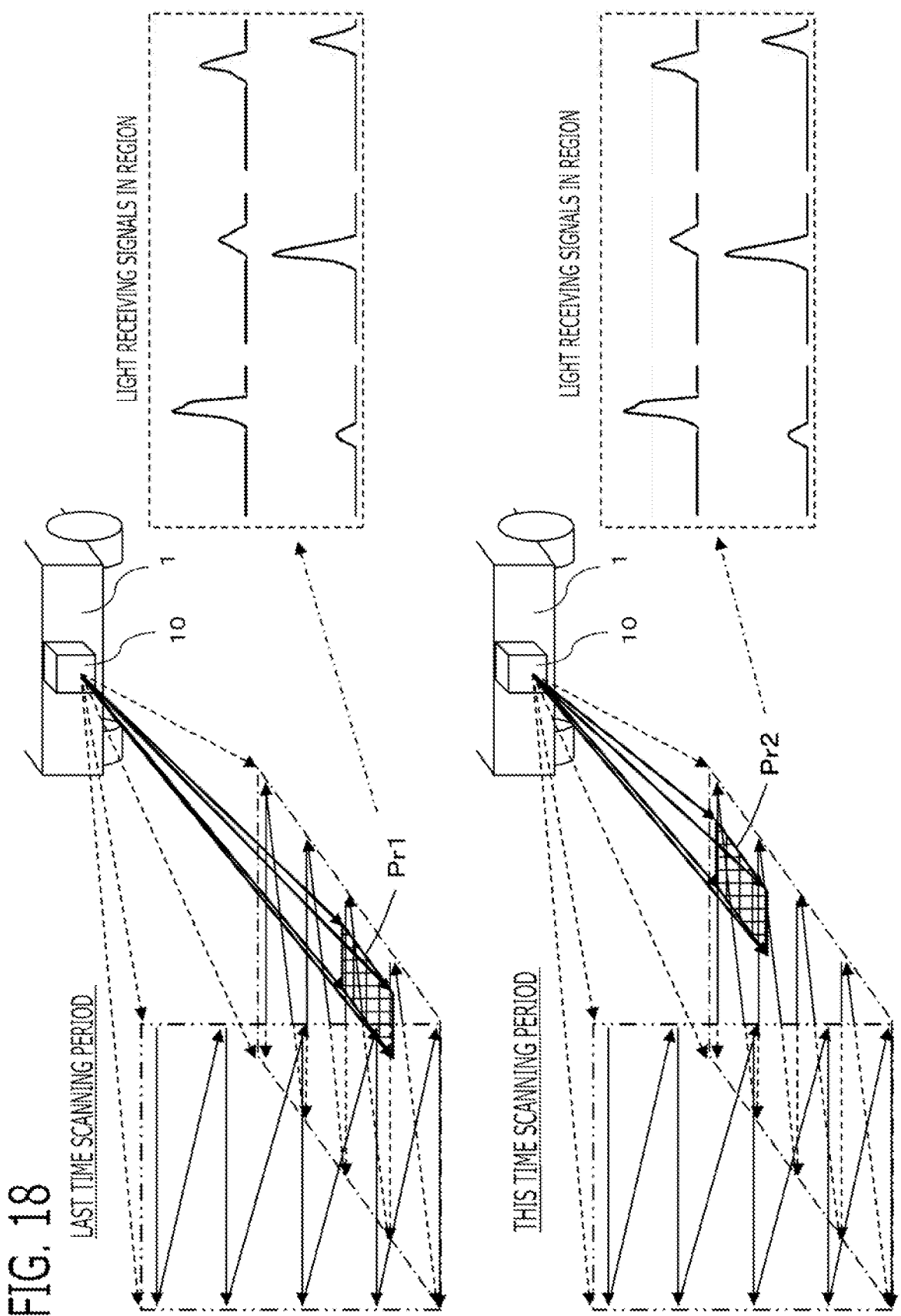
FIG. 18 is a figure for explaining the stop determination of the moving body and the slow speed determination according to Embodiment 4.

For example, as shown in the upper row of FIG. 18, the speed determination unit 17 sets the light receiving signal detected at each irradiation angle included in preliminarily set past determination region Pr1 in the last time scanning period, to a comparison source. Then, as shown in the lower row of FIG. 18, from the light receiving signals of a plurality of irradiation angles detected in this time scanning period, the speed determination unit 17 searches for the irradiation angle region which has the light receiving intensity corresponding to the light receiving intensity of the light receiving signal detected at each of a plurality of irradiation angles included in the past determination region Pr1 in the last time scanning period. When there is the corresponding irradiation angle region, the speed determination unit 17 determines its irradiation angle region as this time determination region Pr2.

In the present embodiment, as shown in FIG. 18, the scanning direction of the laser beam is set to the direction which approaches from the front of the moving body 1 to the moving body 1. As similar to Embodiment 1, the speed determination unit 17 determines whether or not the moving body 1 stops, by comparing the light receiving signal detected at each irradiation angle in the past determination region Pr1 in the last time scanning period with the light receiving signal detected at each irradiation angle in the same region as the past determination region Pr1 in this time scanning period. For example, the speed determination unit 17 finally determines that the moving body 1 stops, when there are determination number (for example, majority) or more of the irradiation angles in the region which are determined that the moving body 1 stops, and finally determines that the moving body 1 does not stop, when there is no determination number or more of the irradiation angles. In the example of and FIG. 18, since there is no irradiation angle in the same region which is determined that the moving body 1 stops, it is finally determined that the moving body 1 does not stop.

Then, when it is determined that the moving body 1 does not stop, the speed determination unit 17 determines the irradiation angle region of this time scanning period in which the light receiving intensities and those arrangements in the region correspond to the light receiving intensities and those arrangements in the region detected at respective irradiation angles in the past determination region Pr1 in the last time scanning period. Then, when it is determined that there is the region in which the light receiving intensities and those arrangements in the region correspond, the speed determination unit 17 determines its irradiation angle region as this time determination region Pr2. For example, the speed determination unit 17 sets the region with the range equivalent to the past determination region Pr1 while shifting little by little, in the irradiation angle range of this time scanning period; determines whether the light receiving intensity of each irradiation angle in the set region corresponds to the light receiving intensity of each irradiation angle of corresponding arrangement in the past determination region Pr1; and determines its region as this time determination region Pr2, when there are determination number (for example, majority) or more of the irradiation angles determined that the light receiving intensity corresponds. When there are a plurality of corresponding regions, a region with the highest correspondence degree may be determined as this time determination region Pr2.

In the example of FIG. 18, it is determined that the light receiving intensity of each irradiation angle in the region shown in the figure of this time scanning period corresponds to the light receiving intensity of each corresponding irradiation angle in the past determination region Pr1, and the region is determined as this time determination region Pr2.

About each irradiation angles at which the arrangements in the region correspond to each other in the past determination region Pr1 and this time determination region Pr2 which are determined that the light receiving intensities correspond to each other, the speed determination unit 17 calculates the moving body speed Vx by the same method as Embodiment 2. Then, the speed determination unit 17 determines whether or not an average value of the moving body speeds Vx is less than or equal to the preliminarily set determination speed. Alternatively, the moving body speed Vx may be calculated about the representative irradiation angle in the region. In this way, since each light receiving signals in the region are compared considering the arrangements of each irradiation angles in the region, and the speed information of the moving body is determined, determination accuracy can be improved.

5. Embodiment 5

Next, the laser distance measuring apparatus 10 according to Embodiment 5 will be explained. The explanation for constituent parts the same as those in each of Embodiments 1 and 2 will be omitted. The basic configuration of the laser distance measuring apparatus 10 according to the present embodiment is the same as that of Embodiments 1 and 2. However, Embodiment 5 is different from Embodiments 1 and 2 in that two laser beam generating units are provided and the light receiving signal by the first laser beam generating unit is compared with the light receiving signal by the second laser beam generating unit.

For example, one MEMS mirror may reflect laser beams of two laser beam sources which have angular difference, or each of two laser beam sources may be provided with one MEMS mirror.

Figure 19:
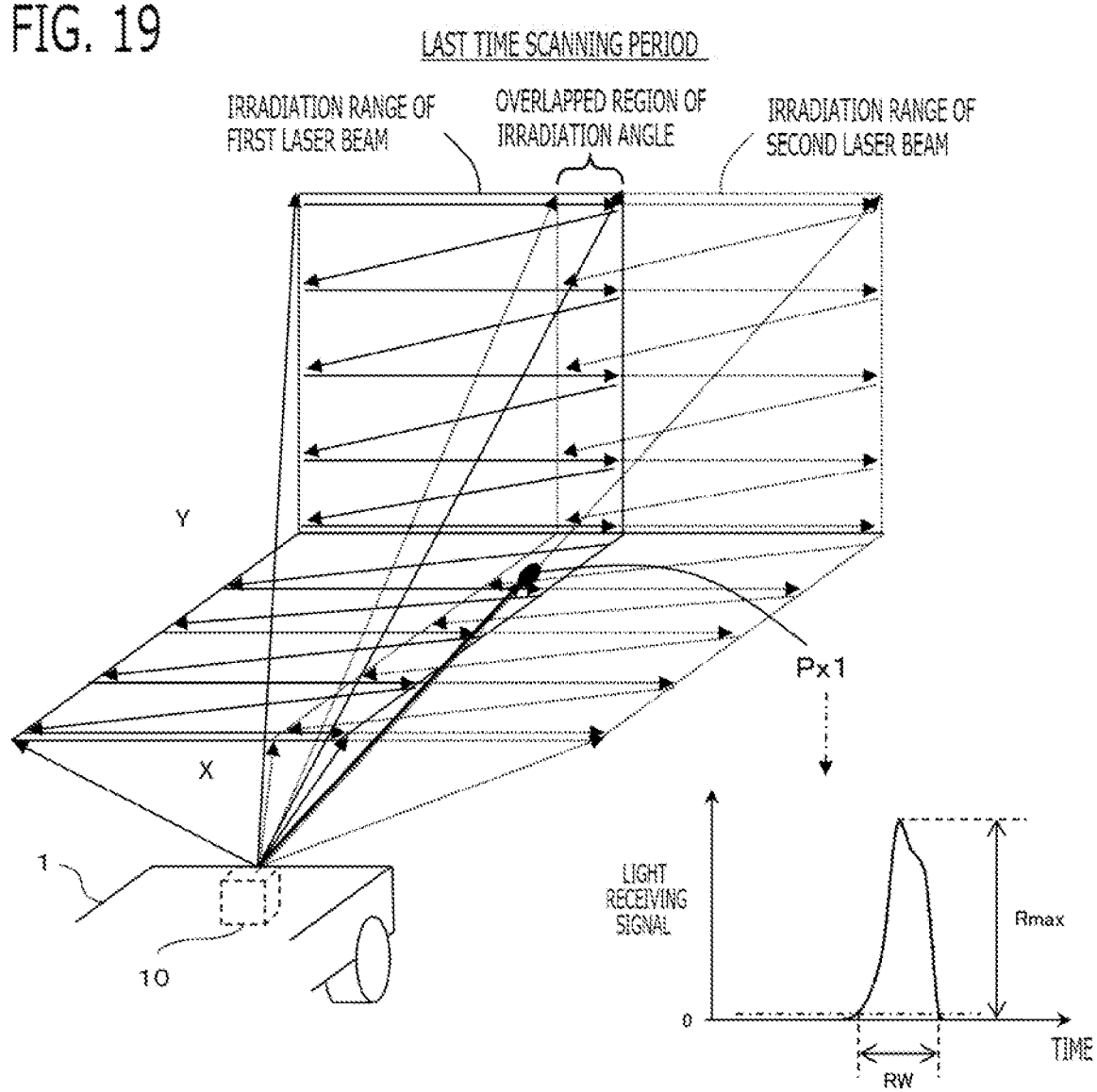
FIG. 19 is a figure for explaining the stop determination of the moving body and the slow speed determination according to Embodiment 5.
Figure 20:
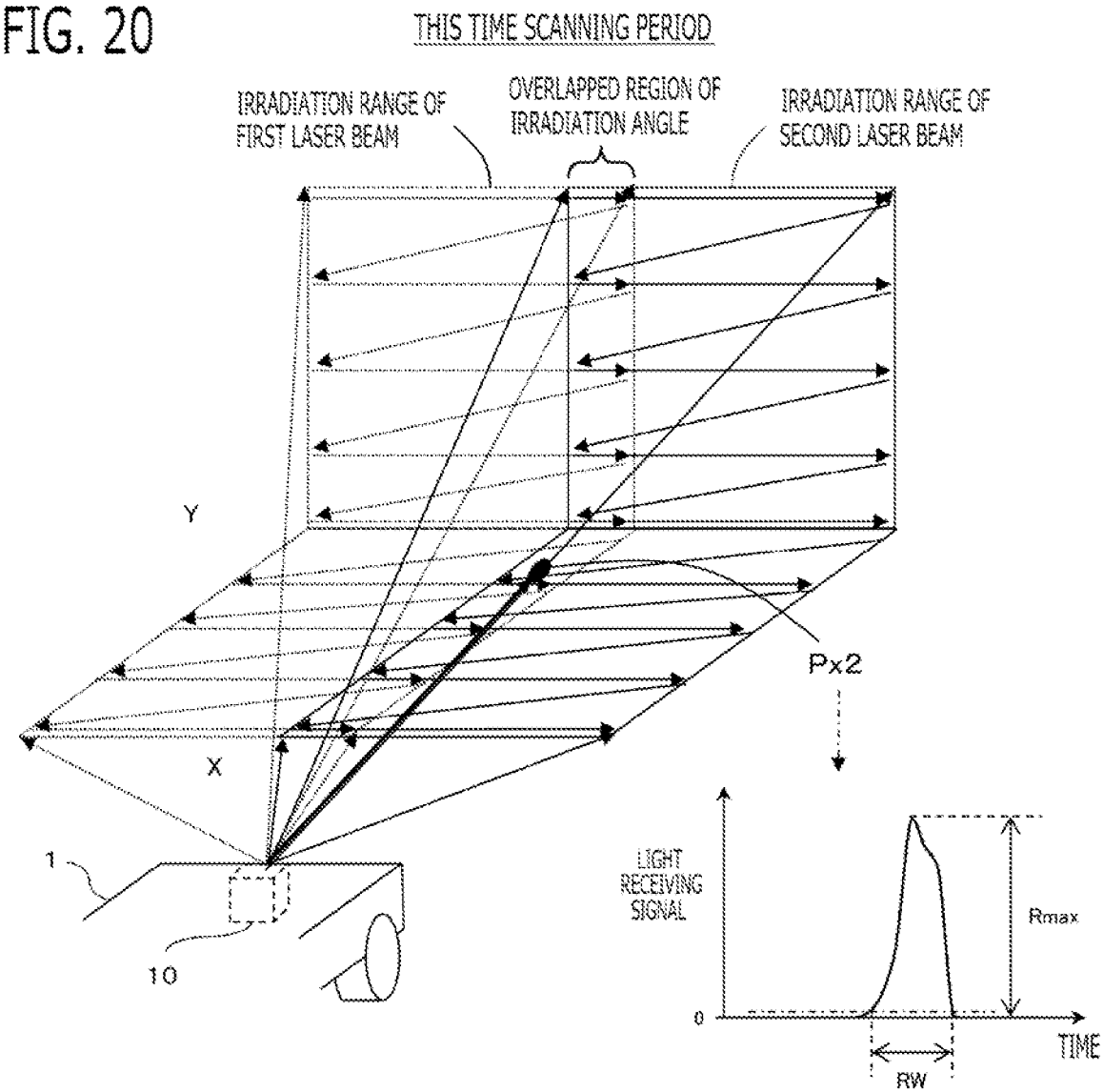
FIG. 20 is a figure for explaining the stop determination of the moving body and the slow speed determination according to Embodiment 5.

In the present embodiment, as shown in FIG. 19 and FIG. 20, the irradiation range of the laser beam of the first laser beam generating unit and the irradiation range of the laser beam of a second laser beam generating unit overlap. In the example shown in FIG. 19 and FIG. 20, a part of the right and left direction X overlaps. The two-dimensional scan by the laser beam of the first laser beam generating unit and the two-dimensional scan by the laser beam of the second laser beam generating unit are performed alternately with a time difference.

In the region (hereinafter, referred as to the overlapped region of irradiation angle) where the range of the irradiation angle of the laser beam of the first laser beam generating unit and the range of the irradiation angle of the laser beam of the second laser beam generating unit overlap, the speed determination unit 17 compares the light receiving signal by the first laser beam generating unit with the light receiving signal by the second laser beam generating unit, and determines the speed information of the moving body.

The speed determination unit 17 determines whether or not the moving body 1 stops, by comparing the light receiving signal detected in the scanning period of the first laser beam generating unit and the light receiving signal detected in the scanning period of the second laser beam generating unit, which are detected at the same irradiation angle in the overlapped region of irradiation angle.

The speed determination unit 17 determines the first determination angle Px1 which is an irradiation angle of the scanning period of the first laser beam generating unit and the second determination angle Px2 which is an irradiation angles of the scanning period of the second laser beam generating unit at which the light receiving intensities of the light receiving signals correspond to each other at the same irradiation angle in the overlapped region of irradiation angle, between the light receiving signals detected in the scanning period of the first laser beam generating unit and the light receiving signals detected in the scanning period of the second laser beam generating unit.

For example, as shown in FIG. 19, the speed determination unit 17 sets the light receiving signal detected at the first determination angle Px1 which is set to a predetermined irradiation angle in the overlapped region of irradiation angle in the last time scanning period of the first laser beam generating unit, to a comparison source. Then, as shown in FIG. 20, from the light receiving signals of a plurality of irradiation angles detected in the overlapped region of irradiation angle in this time scanning period of the second laser beam generating unit, the speed determination unit 17 searches for the light receiving signal which has the light receiving intensity corresponding to the light receiving intensity of the light receiving signal detected at the first determination angle Px1 in the last time scanning period. When there is the corresponding light receiving signal, the speed determination unit 17 determines the irradiation angle of its light receiving signal to the second determination angle Px2. When there are a plurality of corresponding irradiation angles, an irradiation angle with the highest correspondence degree may be determined as the second determination angle Px2. The speed determination unit 17 may compare the light receiving signals about a plurality of irradiation angles like Embodiment 3, or may compare the light receiving signals about the irradiation angle region like Embodiment 4.

About the first determination angle Px1 and the second determination angle Px2 which are determined that the light receiving intensities correspond to each other, the speed determination unit 17 calculates the moving body speed Vx by the same method as Embodiment 2. Then, the speed determination unit 17 determines whether or not the moving body speed Vx is less than or equal to the preliminarily set determination speed. In this way, when two laser beam generating units are provided, the speed information can be determined using the overlapped region of irradiation range.

6. Embodiment 6

Next, the laser distance measuring apparatus 10 according to Embodiment 6 will be explained. The explanation for constituent parts the same as those in each of Embodiments 1 and 2 will be omitted. The basic configuration of the laser distance measuring apparatus 10 according to the present embodiment is the same as that of Embodiment 1. Embodiment 6 is different from Embodiment 1 in that the speed determination unit 17 determines the speed information of the moving body based on the speed information of the object detected by the laser beam.

In the present embodiment, the speed determination unit 17 detects the object (in this example, stationary object other than the road surface) based on the distance of the detection object calculated by the distance calculation unit 15, and determines speed information of the moving body based on change of the distance of the object calculated based on the light receiving signals detected at two time points.

The speed determination unit 17 recognizes shape and relative velocity of the detection object based on each irradiation angle and the distance of the detection object calculated at each irradiation angle, and recognizes the road surface and the stationary object other than the road surface based on the shape and the relative velocity of the detection object. Well-known technology, for example, Artificial Intelligence technology using neural network, is used for this recognition of the stationary object.

This will be explained using FIG. 21. As shown in the upper row of FIG. 21, in the last time scanning period, there is a road sign supported by the pole in front of the moving body 1, and the distance of each part Px101, Px102, Px103, Px104, Px105 of the road sign to which the laser beam is irradiated is calculated. Since the distance of each part of the road sign becomes an equivalent distance, and it is recognized as rod-like shape from the irradiation angle region where those equivalent distances are calculated, it is recognized as the stationary object other than the road surface by recognition processing, the distance of each part of its stationary object is also calculated.

Then, as shown in the lower row of FIG. 21, also in this time scanning period, the road sign is recognized as the stationary object other than the road surface, the distance of each part Px201, Px202, Px203, Px204, Px205, Px206, Px207 of its stationary object is also calculated. Then, the speed determination unit 17 calculates the moving body speed by dividing a difference between the distance of the stationary object detected in the last time scanning period and the distance of the stationary object detected in this time scanning period by a time difference between this time scanning period and the last time scanning period, and determines whether the moving body 1 stops, and whether the moving body speed is less than or equal to the determination speed. When a plurality of stationary objects other than the road surface are detected, the moving body speeds may be calculated about a plurality of stationary objects, and an average value of the moving body speeds may be calculated. Then, as similar to Embodiments 1 and 2, when it is determined that the moving body 1 stops or it is determined that the moving body speed is less than or equal to the determination speed, the average power control unit 18 makes the average power of the laser beam lower than other cases.

Other Embodiments

Lastly, other embodiments of the present disclosure will be explained. Each of the configurations of embodiments to be explained below is not limited to be separately utilized but can be utilized in combination with the configurations of other embodiments as long as no discrepancy occurs.

(1) In each of the above-mentioned Embodiments, there has been explained the case where the scanning mechanism 12 is provided with the MEMS mirror 121. However, the scanning mechanism 12 may be provided with scanning mechanisms other than the MEMS mirror 121. For example, the scanning mechanism 12 may be provided with a rotary polygon mirror as the movable mirror, and may be provided with a mechanism that inclines a rotary shaft of the rotary polygon mirror so that the irradiation angle range of the up and down direction moves to the up side or the down side.

(2) In each of the above embodiments, there has been explained the case where the minute mirror is moved by Lorentz force. However, the movable mechanism of minute mirror is not limited to the electromagnetic method such as Lorentz force, may be a piezo-electric method using a piezoelectric element, or an electrostatic method using electrostatic force by the potential difference between mirror and electrode.

(3) In each of the above embodiments, there has been explained the case where the two-dimensional scan is performed by the scan as shown in FIG. 5 using the MEMS mirror 121. However, the two-dimensional scan may be performed by a Lissajous scan or a raster scan using the MEMS mirror 121; and a precessional scan may be performed using a sphere mirror.

(4) In each of the above embodiments, there has been explained the case where the two-dimensional scan is performed using the MEMS mirror 121 which rotates the mirror around two rotary shafts. However, the two-dimensional scan may be performed using two MEMS mirrors each of which rotates the mirror around one rotary shaft.

(5) In each of the above embodiments, there has been explained the case where the light detector 131 receives the reflected light L2 reflected by the MEMS mirror 121 and the collection mirror 133. However, the light detector 131 may receive directly the reflected light L2 reflected by the object.

(6) In each of the above embodiments, there has been explained the case where a type which transmits and receives pulsed light using the incoherent detection method is used. A type which transmits and receives pulsed light using a coherent detection method may be used. A type which transmits and receives the laser beam to which intensity modulation was performed by the sine wave may be used. It may be an incoherent FMCW (Frequency Modulated Continuous Waves) method. And, it may be a coherent FMCW method.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. A laser distance measuring apparatus mounted on a moving body, comprising:
   a laser beam generator that emits a laser beam;
   a light receiver that receives a reflected light of the laser beam reflected by an object, and outputs a light receiving signal;

a distance calculator that calculates a distance to the object, based on the emitted laser beam and the light receiving signal;

a speed determiner that determines whether or not the moving body stops by comparing the light receiving signals detected at two time points at the same irradiation angle; and an average power controller that, when it is determined that the moving body stops by the speed determiner, makes an average power per unit area and unit time of the laser beam emitted from the laser beam generator lower than that of when it is determined that the moving body does not stop.

2. The laser distance measuring apparatus according to claim 1, further comprising:

a scanning mechanism that change an irradiation angle of the laser beam, and a scanning controller that controls the scanning mechanism to scan the irradiation angle of the laser beam periodically, wherein the speed determiner determines whether or not the moving body stops by comparing the light receiving signals detected in this time scanning period and past scanning period at the same irradiation angle.

3. The laser distance measuring apparatus according to claim 1, wherein when a difference of two light receiving signals detected at the same irradiation angle is less than or equal to a preliminarily set stop determination value, the speed determiner determines that the moving body stops, and otherwise, the speed determiner determines that the moving body does not stop.

4. The laser distance measuring apparatus according to claim 1, further comprising:

a scanning mechanism that change an irradiation angle of the laser beam, and a scanning controller that controls the scanning mechanism to scan the irradiation angle of the laser beam periodically, wherein the speed determiner determines this time determination angle which is an irradiation angle in this time scanning period and past determination angle which is an irradiation angle of the past scanning period at which light receiving intensities of the light receiving signals correspond to each other, between light receiving signals detected in this time scanning period and light receiving signals detected in the past scanning period, calculates a moving distance of the moving body from an irradiating time point of this time determination angle to an irradiating time point of the past determination angle, based on this time determination distance which is the distance at this time determination angle calculated by the distance calculator, and a past determination distance which is the distance at the past determination angle calculated by the distance calculator, calculates a speed of the moving body, based on the moving distance, and a time difference between the irradiating time point of this time determination angle and the irradiating time point of the past determination angle, and determines whether or not the speed is less than or equal to a preliminarily set determination speed, and wherein when it is determined that the moving body stops, or it is determined that the speed is less than or equal to the determination speed by the speed determiner, the average power controller makes the average power of the laser beam lower than other cases.

5. The laser distance measuring apparatus according to claim 4, wherein the speed determiner calculates the moving distance, based on the past determination angle and this time determination angle in addition to this time determination distance and the past determination distance.

6. The laser distance measuring apparatus according to claim 5, wherein setting this time determination distance to $Lpx2$, setting the past determination distance to $Lpx1$, setting an angular difference between the past determination angle and this time determination angle to $\theta Lx$, and setting the moving distance to $Lx$, the speed determiner calculates the moving distance using a calculation equation of $$Lx=\{Lpx1^2+Lpx2^2-2\times Lpx1\times Lpx2\times \cos(\theta Lx)\}^{1/2}.$$

7. The laser distance measuring apparatus according to claim 1, further comprising:

a scanning mechanism that change an irradiation angle of the laser beam, and a scanning controller that controls the scanning mechanism to scan the irradiation angle of the laser beam periodically, wherein the speed determiner determines speed information of the moving body, based on the light receiving signals in an irradiation angle range where the laser beam is irradiated to a road surface.

8. The laser distance measuring apparatus according to claim 1, further comprising:

a scanning mechanism that change an irradiation angle of the laser beam, and a scanning controller that controls the scanning mechanism to scan the irradiation angle of the laser beam periodically, wherein the speed determiner determines speed information of the moving body, by comparing the light receiving signals about a plurality of irradiation angles between this time scanning period and past scanning period.

9. The laser distance measuring apparatus according to claim 1, further comprising:

a scanning mechanism that change an irradiation angle of the laser beam, and a scanning controller that controls the scanning mechanism to scan the irradiation angle of the laser beam periodically, wherein the speed determiner determines an irradiation angle region of this time scanning period and an irradiation angle region of past scanning period in which the light receiving intensities of the light receiving signals of respective irradiation angles correspond to each other, and determines speed information of the moving body based on difference between the irradiation angle region of this time scanning period and the irradiation angle region of the past scanning period.

10. The laser distance measuring apparatus according to claim 1, further comprising:

a scanning mechanism that change an irradiation angle of the laser beam, and a scanning controller that controls the scanning mechanism to scan the irradiation angle of the laser beam periodically, wherein first and second laser beam generators are provided, an irradiation angle range of laser beam by the first laser beam generator and an irradiation angle range of laser beam by the second laser beam generator overlap, and a scan by the laser beam of the first laser beam generator and a scan by the laser beam of the second laser beam generator are alternately performed with a time difference, and wherein the speed determiner determines the speed information of the moving body by comparing the light receiving signal by the first laser beam generator with the light receiving signal by the second laser beam generator in a region in which the irradiation angle ranges overlap.

11. The laser distance measuring apparatus according to claim 1, wherein the speed determiner determines speed information of the moving body based on one or both of a peak value and a pulse width of the light receiving signal.

12. The laser distance measuring apparatus according to claim 1, wherein the speed determiner detects the object based on the distance calculated by the distance calculator, and determines speed information of the moving body based on change of the distance of the object calculated based on the light receiving signals detected at two time points.

13. The laser distance measuring apparatus according to claim 1, wherein the average power controller lowers the average power of the laser beam by shortening pulse width of the laser beam emitted from the laser beam generator.

14. The laser distance measuring apparatus according to claim 1, wherein the average power controller lowers the average power of the laser beam by lowering peak power of the laser beam emitted from the laser beam generator.

15. The laser distance measuring apparatus according to claim 1, wherein the average power controller lowers the average power of the laser beam by extending emission period of the laser beam emitted from the laser beam generator.

* * * * *